United States Patent
Wernau et al.

(10) Patent No.: US 12,327,311 B2
(45) Date of Patent: Jun. 10, 2025

(54) SYSTEMS AND METHODS FOR EMERGENCY RESPONSE MAPPING AND VISUALIZATION IN THREE DIMENSIONS

(71) Applicant: FNV IP B.V., Leidschendam (NL)

(72) Inventors: Michael Brian Wernau, Leesburg, VA (US); Justin Scott Richwagen, Frederick, MD (US); Azhar Saleh Ibrahim, Brunswick, MD (US); Zachery Edward Kurtz, Fairfield, PA (US); Guy William Meiron, Boonsboro, MD (US); Keith Owens, Boonsboro, MD (US)

(73) Assignee: FNV IP B.V., Leidschendam (NL)

( * ) Notice: Subject to any disclaimer, the term of this patent is extended or adjusted under 35 U.S.C. 154(b) by 250 days.

(21) Appl. No.: 17/882,406

(22) Filed: Aug. 5, 2022

(65) Prior Publication Data

US 2024/0046565 A1 Feb. 8, 2024

(51) Int. Cl.
*G06T 17/05* (2011.01)
*G06T 15/00* (2011.01)

(52) U.S. Cl.
CPC ............ *G06T 17/05* (2013.01); *G06T 15/00* (2013.01); *G06T 2215/12* (2013.01)

(58) Field of Classification Search
CPC ...... G06T 17/05; G06T 15/00; G06T 2215/12
See application file for complete search history.

(56) References Cited

U.S. PATENT DOCUMENTS

| | | | | |
|---|---|---|---|---|
| 9,794,755 B1* | 10/2017 | South | .................... | H04W 4/021 |
| 2014/0005987 A1* | 1/2014 | Maniyath | ................ | G06F 30/13 |
| | | | | 703/1 |
| 2015/0111524 A1* | 4/2015 | South | .................. | G08B 25/016 |
| | | | | 455/404.2 |
| 2015/0130788 A1 | 5/2015 | Bailiang | | |

FOREIGN PATENT DOCUMENTS

EP 0897170 A2 8/1998

OTHER PUBLICATIONS

"How GPS Works", https://www.maptoaster.com/maptoaster-topo-nz/articles/how-gps-works/how-gps-works.html, Nov. 16, 2008. (Year: 2008).*
"How are maps used with GPS and GIS?", https://mapasyst.extension.org/how-are-maps-used-with-gps-and-gis/#:~:text=A%20Geographic%20Information%20System%20(GIS,and%20to%20hide%20selected%20features, Aug. 21, 2019. (Year: 2019).*
International Search Report and Written Opinion for PCT Application No. PCT/IB2023/057911, mail date Oct. 31, 2023, 10 pages.

* cited by examiner

*Primary Examiner* — Michelle L Sams
(74) *Attorney, Agent, or Firm* — Polsinelli PC

(57) ABSTRACT

The present disclosure is directed to systems and techniques for providing immersive and interactive three-dimensional (3D) mapping data and visualizations thereof for emergency response incidents. In one example, the systems and techniques can obtain location information associated with an incident and obtain one or more portions of three-dimensional (3D) mapping data based on the location information associated with the incident. A 3D scene associated with the (Continued)

incident can be generated, wherein the 3D scene is generated based on the one or more portions of 3D mapping data. A first 3D view of the 3D scene can be generated, wherein the first 3D view includes one or more incident location indicators representing the location information of the incident relative to the 3D scene.

22 Claims, 14 Drawing Sheets

SYSTEMS AND METHODS FOR EMERGENCY RESPONSE MAPPING AND VISUALIZATION IN THREE DIMENSIONS

TECHNICAL FIELD

The present disclosure generally relates to automated and/or semi-automated mapping and rendering of map data. For example, embodiments of the present disclosure are related to automatically rendering one or more map data views for emergency response scenarios.

BACKGROUND

Emergency response services often rely upon location information in coordinating and/or providing a response to various incidents and other emergency scenarios. For example, emergency call center operators and/or dispatchers need basic location information of where an incident has occurred to direct emergency response resources (e.g., police officers, firefighters, ambulances, etc.) to the scene of the incident. Traditionally, emergency response has been coordinated based on a street address, often relayed verbally over the phone to an emergency call center operator.

When location information is obtained verbally in a phone call, errors in communication can occur between the individual who provides the address (e.g., the caller speaking with an emergency call center operator) and the individual who records the address (e.g., the emergency call center operator). Additionally, errors may also occur when an emergency call center operator distributes the address to the appropriate emergency response resources that are selected for dispatch to respond to the emergency at the given address.

In many cases, an emergency call center operator must translate a spoken address from a phone call into an electronic representation of the same address that is compatible with one or more back-end systems used to provide emergency response services. For example, these back-end systems can include navigation systems used to route or direct first responders (e.g., police, firefighters, etc.) to the scene of the incident; emergency response management systems utilized to track ongoing and completed incidents, the current allocation of emergency response resources within a service area, etc.; and/or mapping systems that localize the location of the incident (e.g., the spoken address given to the emergency call center operator) within the context of existing map data.

For example, emergency call center operators and dispatchers may utilize one or more mapping resources or mapping databases to provide visualization of the location of a reported incident and/or to improve situational awareness of the incident and the surrounding environment of the incident. For instance, an emergency call center operator or dispatcher may receive a report of a fire at a given address. Based on consulting map data, the emergency call center operator or dispatcher can determine supplemental information that may be used to augment (e.g., improve) the emergency response to the fire. For example, map data can enable determinations such as whether the reported address is the location of a business or a residential building, whether there are any attached or adjacent structures to which the fire may spread, etc. Map data can additionally enable the selection of appropriate streets to close, optimal staging zones for emergency response resources (e.g., an active firefighting zone, a triage or medical assistance zone, etc.), and/or the positioning of emergency response resources near support infrastructure (e.g., positioning firetrucks within range of fire hydrants).

In many cases, emergency call center operators and/or dispatchers rely upon two-dimensional (2D) maps to obtain situational awareness of the location and surrounding environment of an incident. In some cases, emergency call center operators, dispatchers, first responders, and/or other emergency response resources may rely upon physical 2D maps and/or personal geographic knowledge at various stages of coordination and while providing an emergency response. Currently, emergency response services may be seen to be limited to 2D maps and other limited visibility information sources. There thus exists a need for improved systems and techniques for providing immersive and interactive three-dimensional (3D) mapping data and visualizations thereof for emergency response incidents.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Figure 1A:
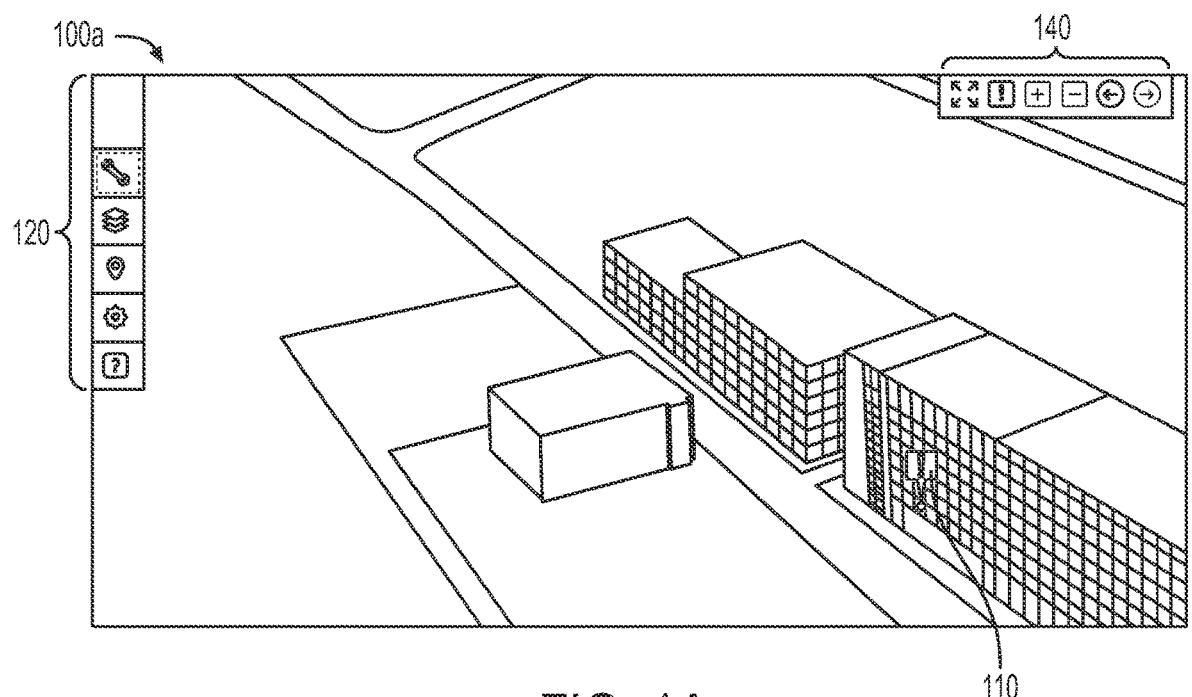
FIG. 1A is a diagram illustrating an example user interface of a three-dimensional (3D) mapping emergency response planning and coordination system, according to embodiments of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. A reference to an embodiment in the present disclosure can be a reference to the same embodiment or any other embodiment. Such references thus relate to at least one of the embodiments herein.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, apparatuses, methods, and computer-readable media for automatically rendering one or more three-dimensional (3D) map data views and/or 3D visualizations for emergency response incidents. For example, a method can include obtaining location information associated with an incident; obtaining one or more portions of three-dimensional (3D) mapping data based on the location information associated with the incident; generating a 3D scene associated with the incident, wherein the 3D scene is generated based on the one or more portions of 3D mapping data; and rendering a first 3D view of the 3D scene, wherein the first 3D view includes one or more incident location indicators representing the location information of the incident relative to the 3D scene.

In an embodiment, the location information includes at least one set of 3D coordinates associated with the incident.

In another embodiment, the one or more incident location indicators include: a first incident location indicator associated with a two-dimensional (2D) location of the incident; and a second incident location indicator associated with a 3D location of the incident, wherein the 3D location of the incident includes height information and the 2D location of the incident does not include height information.

In an embodiment, the method further comprises rendering a second 3D view of the 3D scene, wherein the second 3D view of the 3D scene includes at least one of the incident location indicators and is generated based on incident height information included in the location information.

In an embodiment, the second 3D view of the 3D scene includes the second incident location indicator; the second incident location indicator is generated based on the incident height information included in the location information; and the second 3D view of the 3D scene comprises one or more portions of the 3D scene associated with a height larger than the second incident location indicator, wherein said one or more portions of the 3D scene are rendered as transparent or semi-transparent.

In another embodiment, the 3D scene is generated to include one or more rendered 3D building structures each including a plurality of different floors, each respective floor of the plurality of different floors associated with a different height.

In another embodiment, the second 3D view includes: the first incident location indicator, the first incident location indicator rendered at a height that is above the plurality of different floors included in a given rendered 3D building structure associated with the location information of the incident; and the second incident location indicator, the second incident location indicator rendered at a respective floor of the given rendered 3D building structure that is associated with the incident height information.

In another embodiment, the method further comprises: rendering the second 3D view of the 3D scene by: generating an opaque rendering of the respective floor of the given rendered 3D building structure that is associated with the incident height information, wherein the first incident location indicator is rendered above an upper surface of the opaque rendering of the respective floor; and generating one or more transparent or semi-transparent renderings of floors included in the given rendered 3D building and not associated with the incident height information.

In an embodiment, the 3D mapping data includes Geographic Information System (GIS) data.

In another embodiment, the method further comprises: obtaining data, preferably wherein the data comprises one or more user inputs, indicative of a collapse zone area, the collapse zone area included in the 3D scene; and generating a collapse zone overlay on the first 3D view of the 3D scene, wherein the collapse zone overlay is generated based on at least the collapse zone area.

In an embodiment, the collapse zone area comprises a base collapse zone shape, such as a 2D polygon, coplanar with or parallel to a ground surface of the 3D scene; and the data, such as wherein the data comprises one or more user inputs, are further indicative of a maximum building height associated with the base collapse zone shape, preferably the 2D polygon, of the collapse zone area.

In an embodiment, the method further comprises: obtaining data, such as one or more user inputs, indicative of a safety zone area, the safety zone area included in the 3D scene; and generating one or more safety zone overlays on the first 3D view of the 3D scene, wherein the one or more safety zone overlays are each generated based on at least the safety zone area.

In an embodiment, the safety zone area comprises a safety zone center point coplanar with a ground surface of the 3D scene or comprises a base safety zone shape, such as a 2D polygon, coplanar with or parallel to the ground surface of the 3D scene; and the one or more user inputs indicative of a safety zone area are further indicative of at least one dimensional coordinate associated with each safety zone overlay, the at least one dimensional coordinate defined with respect to the safety zone center point or an outer perimeter of the base safety zone shape, such as the 2D polygon.

In one aspect according to the disclosure, a system is provided that includes one or more processors and one or more computer-readable storage media having computer-readable instructions stored thereon, wherein the computer-readable instructions, when executed by the one or more processors, cause the one or more processors to: obtain location information associated with an incident; obtain one or more portions of three-dimensional (3D) mapping data based on the location information associated with the incident; generate a 3D scene associated with the incident, wherein the 3D scene is generated based on the one or more portions of 3D mapping data; and render a first 3D view of the 3D scene, wherein the first 3D view includes one or more incident location indicators representing the location information of the incident relative to the 3D scene.

In one aspect according to the disclosure, one or more non-transitory computer-readable media includes computer-readable instructions that, when executed by one or more processors, cause the one or more processors to: obtain location information associated with an incident; obtain one or more portions of three-dimensional (3D) mapping data based on the location information associated with the incident; generate a 3D scene associated with the incident, wherein the 3D scene is generated based on the one or more portions of 3D mapping data; and render a first 3D view of the 3D scene, wherein the first 3D view includes one or more incident location indicators representing the location information of the incident relative to the 3D scene.

In one aspect according to the disclosure, an apparatus is provided. The apparatus includes: means for obtaining location information associated with an incident; means for obtaining one or more portions of three-dimensional (3D) mapping data based on the location information associated with the incident; means for generating a 3D scene associated with the incident, wherein the 3D scene is generated based on the one or more portions of 3D mapping data; and means for rendering a first 3D view of the 3D scene, wherein the first 3D view includes one or more incident location indicators representing the location information of the incident relative to the 3D scene.

Example Embodiments

In many emergency situations, response time is an important consideration—for both recipients of emergency response services and providers of emergency response services (e.g., police, firefighters, emergency medical services (EMS), etc.). The response time of emergency response services can vary at least in part based on the physical travel time taken to route emergency response resources from their current location(s) to the reported location of an emergency incident. Additionally, the response time of emergency response services can vary based on the time taken to coordinate, plan, and/or brief an emergency response strategy amongst the various entities involved in providing the emergency response. In many cases, providing an emergency response may require multiple steps of coordinating and planning the emergency response.

The contribution of travel time to the overall response time (e.g., of emergency response resources) can be viewed as an approximately fixed or static contribution. For instance, while some travel time variation can be expected based on factors such as route selection or route optimization (or lack thereof), travel time can nevertheless be approximated as a known or predictable quantity. By contrast, the contribution of coordination/planning time to the overall response time is often unpredictable and can vary significantly from one incident to another, based on a wide variety of factors that are specific to a given incident at hand. Moreover, time spent coordinating and/or planning an emergency response may occur at multiple different stages of the overall emergency response.

For example, coordination and planning time may be required prior to or concurrent with dispatching emergency response resources (e.g., performed by an emergency call center operator or dispatcher) and subsequently, additional coordination and planning time may be required once emergency response resources arrive on scene. Further still, time spent coordinating and planning an emergency response strategy may often be duplicative, ultimately prolonging the overall response time of emergency response resources in a manner that could be avoided by providing improved situational awareness (and/or information sharing capabilities) to emergency call center operators (amongst other emergency response resources).

The present technology includes systems, methods, and computer-readable media (also referred to as "systems and techniques") for solving these problems and discrepancies.

As mentioned previously, emergency call center operators and dispatchers may utilize one or more mapping resources or mapping databases to provide visualization of the location of a reported incident and/or to improve situational awareness of the incident and the surrounding environment of the incident. For instance, an emergency call center operator or dispatcher may receive a report of a fire at given address. Based on consulting map data, the emergency call center operator or dispatcher can determine supplemental information that may be used to augment (e.g., improve) the emergency response to the fire. For example, map data can enable determinations such as whether the reported address is the location of a business or a residential building, whether there are any attached or adjacent structures to which the fire may spread, etc. Map data can additionally enable the selection of appropriate streets to close, optimal staging zones for emergency response resources (e.g., an active firefighting zone, a triage or medical assistance zone, etc.), and/or the positioning of emergency response resources near support infrastructure (e.g., positioning firetrucks within range of fire hydrants).

In many cases, emergency call center operators and/or dispatchers rely upon two-dimensional (2D) maps to obtain situational awareness of the location and surrounding environment of an incident. In some cases, emergency call center operators, dispatchers, first responders, and/or other emergency response resources may rely upon physical 2D maps and/or personal geographic knowledge at various stages of coordination and while providing an emergency response. Currently, emergency response services may be seen to be limited to 2D maps and other limited visibility information sources, despite the existence of more robust mapping data and mapping information.

The systems and techniques described herein can be used to provide improved visualization and situational awareness information for implementing emergency response services. In one illustrative example, the systems and techniques described herein can be used to provide emergency response resources (e.g., including, but not limited to, emergency call center operators or dispatchers) with immersive three-dimensional (3D) mapping data and various automated (and/or semi-automated) tools that leverage the immersive 3D mapping data to reduce an overall emergency response coordination and planning time.

For example, in some embodiments, the systems and techniques described herein can utilize one or more sources of 3D mapping data to automatically localize a reported incident and generate an immersive and interactive 3D visualization of the reported incident and its surrounding environment. In some embodiments, some (or all) of the 3D mapping data can be 3D Geographic Information System (GIS) data. In some embodiments, some (or all) of the 3D mapping data can be obtained from or otherwise supplied by a Computer-Aided Dispatch (CAD) system. In some cases, the systems and techniques described herein can be implemented in a CAD system. As will be explained in greater depth below, the systems and techniques described herein can be used to generate immersive and interactive 3D visualizations for reported incidents in a manner that is streamlined to provide optimal efficiency for emergency response call center operators, dispatchers, and/or other emergency response personnel. In some embodiments, the immersive and interactive 3D visualizations described herein can be generated based on minimal user interaction to provide full-fledged and robust situational awareness for a reported incident, as will be described in greater depth below.

FIG. 1A is a diagram illustrating a user interface 100a of a 3D mapping emergency response planning and coordination system, according to an example embodiment of the present disclosure. As will be described in greater depth below, the example user interface 100a presents a 3D view of map data that includes an overlaid emergency location indicator 110. In some embodiments, the overlaid emergency location indicator 110 can be dynamically positioned and repositioned (e.g., as the perspective, orientation, zoom, etc., of the 3D view of map data is changed either automatically or by a user) to indicate the location of a reported emergency or other incident. In one illustrative example, emergency location indicator 110 can be overlaid on the 3D view of map data such that emergency location indicator 110 corresponds to an accurate location of the reported emergency relative to the three-dimensional surrounding environment rendered in the 3D view of map data. For example, in the context of FIG. 1A, emergency location indicator 110 is overlaid to correspond to an accurate location of an incident on the second floor of a building.

Conventionally, emergency response planning and coordinate systems have relied upon only two-dimensional representations of the location of an incident. For example, an incident location may be reported or otherwise represented using a latitude and longitude coordinate (x, y coordinates). However, existing emergency response planning and coordinate systems largely are not seen to introduce a third coordinate or dimension to represent the verticality or height associated with the location of a reported incident. In one illustrative example, the systems and techniques described herein can be used to provide three-dimensional visualization and/or rendering of the location of a reported incident and/or the surrounding environment.

In certain example embodiments, as illustrated in FIG. 1A, the emergency location indicator 110 can be rendered based on a three-dimensional position or coordinate (e.g., x, y, z) corresponding to the location of the reported emergency or incident. As such, emergency location indicator 110 indicates not only the 2D or (x, y) location of a reported incident, but also indicates a height (e.g., along the z-axis) of the reported incident. In the example of FIG. 1A, emergency location indicator 110 can be seen to indicate that the reported incident is located on the second floor of the building. In some embodiments, providing an interactive (e.g., repositionable or otherwise manipulable by the user) 3D visualization or rendering of an emergency response scene/location can improve the efficiency and response time associated with providing emergency response services, particularly in dense urban environments where buildings with multiple floors are more common.

Figure 1B:
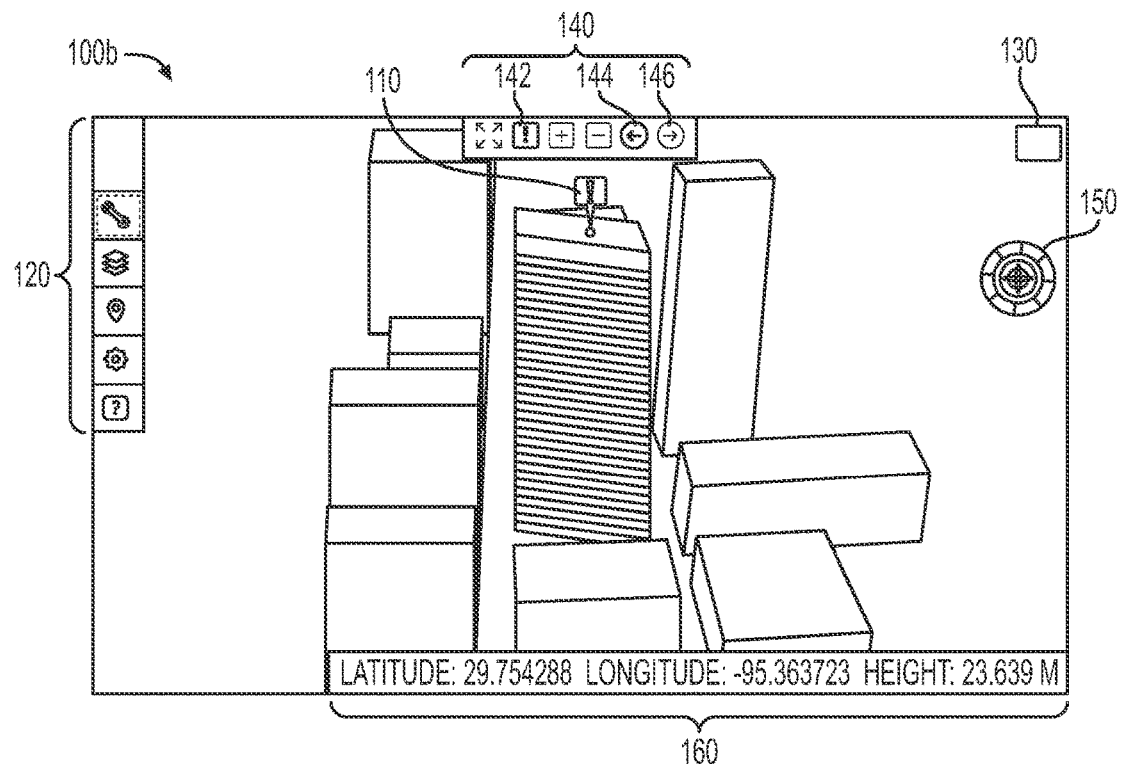
FIG. 1B is another diagram illustrating an example user interface of a 3D mapping emergency response planning and coordination system, according to embodiments of the present disclosure.

In some embodiments, the systems and techniques described herein may be utilized in both residential or low verticality environments (e.g., such as neighborhoods or low-rise building environments such as that depicted in FIG. 1A, or terrain obstacles such as hills, slopes, retaining walls, and other natural/artificial 3D intrusions that may not be identifiable in a 2D visualization) and in dense urban or high verticality environments (e.g., such as city centers or high-rise building environments such as that depicted in FIG. 1). For example, in the context of the high-rise environment shown in FIG. 1B, the emergency response indicator 110 can be positioned to indicate the building in which a reported incident is located. As will be described in greater depth below with respect to FIG. 2, the primary emergency response indicator 110 of FIG. 1B can be supplemented with a secondary emergency response indicator 214 that indicates the precise 3D location of a reported incident.

As illustrated in FIGS. 1A and 1, the example user interfaces 100a and 100b, respectively, can include one or more interactive user interface (UI) or control elements for manipulating the 3D visualization of the emergency response area associated with emergency response indicator 110. For example, the user interfaces 100a, 100b can include a user control panel 120 comprising a plurality of user control elements and can include a navigation control panel 140 comprising a plurality of navigation control elements. In some embodiments, user control panel 120 and the associated plurality of user control elements can be used to annotate or mark-up the rendered 3D environment map data.

For example, the user control panel 120 can include user control elements that provide functionality such as viewing individual floors and/or floor plans of multi-story buildings (e.g., described with respect to FIGS. 2 and 3), making one or more measurements of the physical environment represented in the rendered 3D view (e.g., described with respect to FIGS. 4A and 4B), generating and visualizing one or more safety zones (e.g., described with respect to FIGS. 5A-C), generating and visualizing one or more collapse zones (e.g., described with respect to FIGS. 6A-D), viewing or disabling one or more supplemental or augmented information layers (e.g., described with respect to FIGS. 7A and 7B), searching for and/or saving one or more addresses or real-world locations (e.g., described with respect to FIG. 8), etc.

The navigation control panel 140 can include navigation control elements that provide functionalities such as manipulating the rendered 3D view that is presented in the example user interfaces 100a, 100b. For example, navigation control panel 140 can include a plurality of navigation control elements that provide quick access to a project extent, event (e.g., incident) locations, previous camera locations or rendered views from the current session, etc. For instance, with respect to FIG. 1B, in one illustrative example the navigation control panel 140 can include an incident location navigation control element 142, a camera location/rendered view backward step navigation control element 144, and a camera location/rendered view forward step navigation control element 146.

In some embodiments, the incident location navigation control element 142 can be used to automatically zoom to or fly to a rendered view of the 3D environment surrounding the location of a reported incident (e.g., surrounding the location of emergency response indicator 110). In some cases, the incident location navigation control element 142 can automatically zoom or fly to a rendered 3D view that presents a full-frame visualization of the reported incident. For example, a zoom level triggered by user selection of incident location navigation control element 142 can be determined based on a height of the reported incident location or a total building height of the building in which the reported incident location is located (e.g., a greater zoom level can be triggered when the reported incident location is in a one or two-story residential home, and a lesser zoom level can be triggered when the reported incident location is in a 50 story office tower such as that illustrated in FIG. 1).

In some example embodiments, a base map layer selection element 130 can be included to permit a user to toggle or otherwise select between various different map data sources from which the rendered 3D view is to be generated. For example, the user interfaces 100a and 100b depict scenarios in which the selected map data source (e.g., selected using base map layer selection element 130) is a high-resolution satellite or aerial imagery data source. In some examples, base map layer selection element 130 can be used to select between additional map data sources that can include, but are not limited to, terrain or topographical map data, street map data, infrastructure and utility map data (e.g., showing infrastructure such as sewers, water mains/pipes, electrical transmission lines, train tracks, transit lines or routes, etc.), weather data, etc. In some embodiments, base map layer selection element 130 can be used to select between different providers of a same type of map data. For example, a user may select between multiple different providers of satellite or aerial imagery for the same given area (e.g., for the area depicted in the rendered 3D scene). In some embodiments, base map layer selection element 130 can be automatically populated with the various layers and/or map data sources that are available for the currently depicted location in the rendered 3D view.

In some embodiments, a compass navigation control element 150 can be provided for adjusting the point of view (POV) of the rendered 3D scene. For example, an outer ring of compass navigation control element 150 can be rotated to control the North-South orientation of the rendered 3D scene (e.g., rotating the outer ring counter-clockwise can cause the rendered 3D scene to change from an orientation in which North is up to an orientation in which West is up, etc.; rotating the outer ring clockwise can cause the rendered 3D scene to change from an orientation in which North is up to an orientation in which East is up, etc.). Compass navigation control element 150 can further include an inner rotatable navigation element that can be used to control the tilt of the imaginary camera capturing the rendered POV of the 3D scene. For example, FIGS. 1A and 1B depict rendered 3D views that are approximately halfway between a straight-down or bird's eye view POV and a head-on or street level POV. In some embodiments, a user rotation of the inner rotatable navigation element in a downward direction can increase the tilt of the rendered 3D scene POV (e.g., increases the tilt until a maximum tilt associated with the straight-down, bird's eye view is reached). In some examples, a user rotation of the inner rotatable navigation element in an upward direction can decrease the tilt of the rendered 3D scene POV (e.g., decreases the tilt until a minimum tilt associated with the head-on, street-level view is reached).

In one example embodiment, the systems and techniques described herein can record, store, or otherwise log the visual movements (e.g., changes to the rendered 3D scene POV) that are input by the user and/or performed automatically. For example, one or more camera parameters or POV rendering parameters can be automatically recorded and stored in response to the rendered 3D view remaining static for at least a pre-determined amount of time. In some embodiments, the camera or POV rendering parameters associated with the currently presented 3D view of the scene can be automatically recorded and stored based on determining that the rendered 3D view has remained static for at least one second.

Based on recording or logging the visual movements within the rendered 3D scene, in some embodiments a user can backtrack or retrace their previous viewpoints. For example, a user can utilize the camera location/rendered view backward step navigation control element 144 to backtrack through or otherwise retrace previously viewed viewpoints of the rendered 3D scene. Similarly, a user can utilize the camera location/rendered view forward step navigation control element 146 to advance from a previously viewed viewpoint up to the current or most recently viewed viewpoint. In some embodiments, the backward step navigation control element 144 can be used to implement a visual 'undo' option that allows a user to backtrack by one or more steps from the currently rendered 3D view or POV, and the forward step navigation control element 146 can be used to implement a visual 'redo' option that allows a user to step forward by one or more steps from a previously rendered 3D view or POV.

In some embodiments, a coordinate and altitude display 160 can be included to display the three-dimensional position (e.g., coordinates) associated with a current position of the user's cursor, finger, other input device, etc. For example, when a user interacts with the example user interface 100a, 100b via a mouse cursor, the coordinate and altitude display 160 can display the real-world three-dimensional coordinate associated with the location directly underneath the user's mouse cursor. As illustrated, the real-world three-dimensional coordinate can include a latitude, longitude pair and an altitude, although it is noted that other coordinate systems may also be utilized without departing from the scope of the present disclosure.

Figure 2:
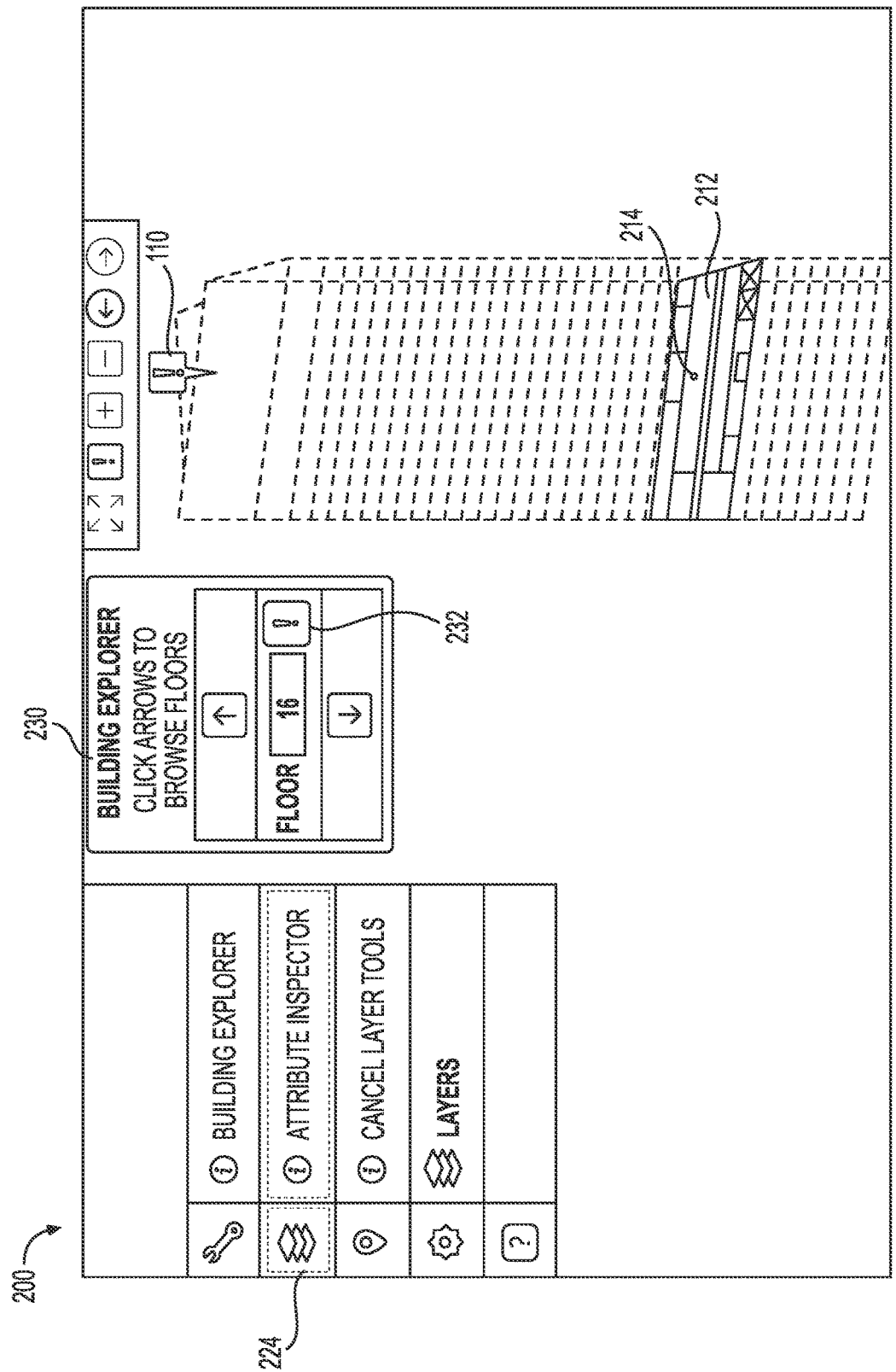
FIG. 2 is a diagram illustrating an example user interface of a vertical explorer tool element of a 3D mapping emergency response planning and coordinate system, according to embodiments of the present disclosure.

The disclosure turns next to FIG. 2, which is a diagram illustrating a user interface 200 of a vertical explorer tool element of the presently disclosed 3D mapping emergency response planning and coordinate system, according to an example embodiment of the present disclosure. In some examples, the underlying 3D scene depicted in the rendered 3D view of FIG. 2 can be the same as the underlying 3D scene depicted in the rendered 3D view of FIG. 1B (e.g., the underlying 3D scene comprising a downtown city center can be the same in FIGS. 1B and 2, with the two figures presenting different rendered 3D views or POVs of the same downtown city center scene).

As mentioned previously, a primary emergency location indicator 110 can be overlaid on the rendered 3D scene to indicate a location of the reported emergency or incident. For example, the primary emergency location indicator 110 can be overlaid on the rendered 3D scene to indicate the building in which the reported incident is located. In some embodiments, the primary emergency location indicator 110 can be positioned at the top of the building in which the reported incident is located (e.g., independent of the actual or specific floor/vertical height at which the reported incident is located within the building).

In some embodiments, one or more location indicators (e.g., such as primary emergency location indicator 110, a secondary emergency location indicator 232, and/or other location information displayed for then reported location of an incident, etc.) can be updated dynamically and or in real-time. For example, while the primary emergency location indicator 110 and the secondary emergency location indicator 232 are described with reference to a fixed or static location within the rendered 3D environment, it is noted that this is done for purposes of clarity of explanation. In some embodiments, one or more (or both) of the primary emergency location indicator 110 and the secondary emergency location indicator 232 can be updated in real-time, based on receiving one or more location information updates that correspond to a reported location of the emergency or incident. In some examples, the location information (and the location information updates) can be received from various external entities, such as cellular network providers/operators, location data entities, etc. In some cases, the location information and/or location information updates can be received as 3D coordinates (e.g., x, y, z; latitude, longitude, altitude; etc.). In some embodiments, the systems and techniques can include one or more user interface (UI) options for stepping forward and backward to view the reported location information at different times. For example, each location information update can be logged as a discrete step, to which the user can backtrack as desired (e.g., using step backward and step forward UI elements, the same as or similar to the backward and forward step UI elements 144 and 146 described above). In some example embodiments, the systems and techniques may interpolate between two or more location information points to generate predicted locations at intermediate times for which location information updates were not received.

In an example embodiment, the user control panel 120 can include a layer selection control element 224. In particular, the layer selection control element can include a 'Building Explorer' option that can be selected by the user to open a corresponding 'Building Explorer' interface 230. In some embodiments, the Building Explorer interface 230 can also be referred to as a vertical slice selection interface and/or a floor selection interface. In one illustrative example, user selection of the Building Explorer interface 230 can cause one or more (or all) of the 3D buildings included in the rendered 3D view to be rendered as transparent or semi-transparent (e.g., FIG. 2 depicts an example in which the 3D buildings are rendered in semi-transparent fashion).

In some embodiments, at least the building indicated by the primary emergency location indicator 110 can be rendered in transparent or semi-transparent fashion. Based on the building associated with primary emergency location indicator 110 being rendered as transparent or semi-transparent, the example user interface 200 can further include a rendering of one or more selected floors or vertical slices within the building associated with primary emergency location indicator 110. For instance, example user interface 200 includes a rendered floor 212, shown here as being rendered in solid or opaque fashion.

The example user interface 200 can further include a secondary or fine emergency location indicator 214 that depicts the precise 3D location or coordinate (e.g., by providing georeferenced location information) of the reported incident/emergency. In some embodiments, when the rendered floor 212 is the floor corresponding to the height (e.g., altitude or z-axis coordinate) of the reported incident location, the secondary emergency location indicator 214 can be rendered on (e.g., coplanar with) the surface of the rendered floor 212.

In some embodiments, the rendered floor 212 can be user-selected using the Building Explorer interface 230. For example, the Building Explorer interface 230 can include an input field allowing a user to enter (e.g., type) a specific floor number that should be depicted as the rendered floor 212. In some examples, the Building Explorer interface 230 can additionally, or alternatively, include floor selection elements (e.g., up and down arrows) the selection of which causes the level of rendered floor 212 to increase or decrease, respectively, by a pre-determined amount. For example, selection of the up arrow depicted in Building Explorer interface 230 can increase the level of rendered floor 212 by one floor and selection of the down arrow depicted in Building Explorer interface 230 can decrease the level of rendered floor 212 by one floor, etc.

In one illustrative example, user selection of the 'Building Explorer' option from the sub-menu associated with layer selection control element 224 can automatically set the rendered floor 212 to be the same as the floor associated with the location of the reported incident. For example, upon selecting the 'Building Explorer' option, the user is automatically presented with the view of FIG. 2 in which buildings are rendered as semi-transparent, the opaque rendered floor 212 is the floor associated with the location of the reported incident, and a fine-grained emergency location indicator 214 is overlaid to represent the precise 3D location of the reported incident within the 3D scene/view. In some example embodiments, the Building Explorer interface 230 can include an incident selection UI element 232 the selection of which automatically jumps to displaying the rendered floor 212 as the floor associated with the 3D location of the reported incident.

Figure 3:
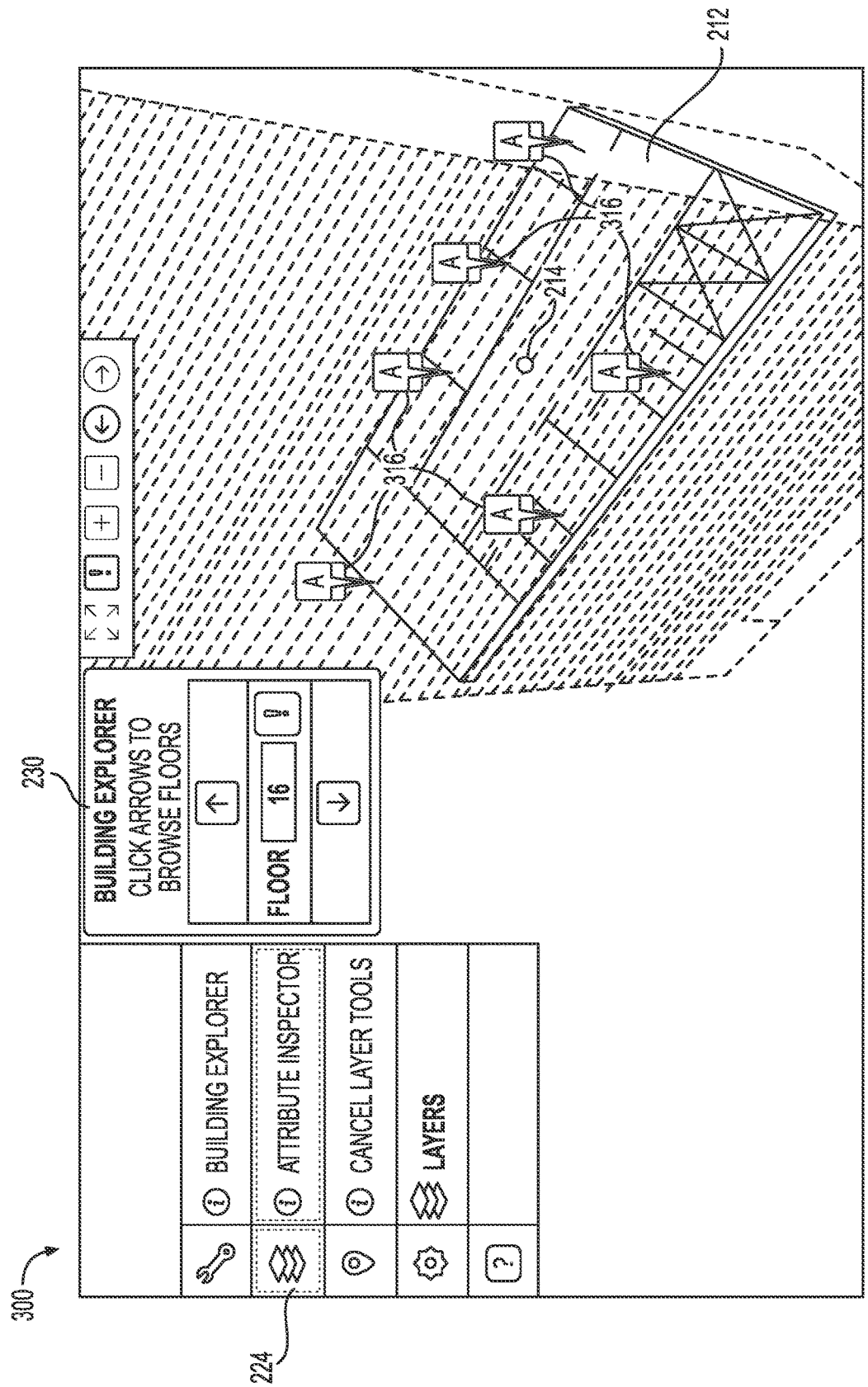
FIG. 3 is a diagram illustrating an example user interface including a rendered floorplan of a selected floor, according to embodiments of the present disclosure.

In some embodiments, the rendered floor 212 can include an overlay or other representation of a floorplan corresponding to the physical layout of the rendered floor 212. For example, FIG. 3 is a diagram illustrating an example user interface 300 including a rendered floorplan of a selected floor, according to example embodiments of the present disclosure. In one illustrative example, the rendered floorplan 212 illustrated in FIG. 3 can be the same as or similar to the opaque rendered floor 212 illustrated in FIG. 2. In some examples, the systems and techniques described herein can automatically toggle between the rendered floor depicted in FIG. 2 (e.g., without a detailed floorplan overlaid on rendered floor 212) and the rendered floor depicted in FIG. 3 (e.g., including the detailed floorplan overlaid on rendered floor 212), based at least in part on a zoom level of the rendered 3D view. For example, the detailed floorplan overlaid on rendered floor 212 may be presented in response to the zoom level of the rendered 3D view being greater than a threshold (e.g., sufficiently zoomed in to be able to view and/or distinguish the details of the floorplan overlay).

In some embodiments, the detailed floorplan overlay on rendered floor 212 (e.g., as illustrated in FIG. 3) can be automatically generated and/or rendered in response to the zoom level of the current 3D view reaching or surpassing the pre-determined threshold. In some cases, the pre-determined threshold can be dynamic (e.g., based on a resolution of a display used to present the example user interface 300 to a user, based on a window size of a UI viewer on the display, etc.) In some embodiments, the detailed floorplan overlay on rendered floor 212 can include one or more location indicators 316. For example, the location indicators 316 can represent the location of fire extinguishers within the real-world space associated with the rendered floorplan 212, although other objects may also be represented by location indicators 316 without departing from the scope of the present disclosure. In some examples, one or more location indicators (e.g., such as location indicators 316) can be used to represent objects or specific locations within the rendered floorplan 212 of which emergency responders may desire awareness of. For example, one or more location indicators (e.g., such as location indicators 316) can be used to represent the location of defibrillators, emergency exits, eye wash stations, hazardous materials, stairwells, safes or vaults, sprinkler systems, alarms, alarm control panels, electrical control panels, etc. In some embodiments of the invention, the location indicators 316 can be overlaid on rendered floorplan 212 such that each location indicator 316 is mapped to a fixed 3D coordinate (e.g., the relative position of location indicators 316 relative to one another, relative to the features of the floorplan 212, and/or relative to the fine-grained emergency location indicator 214) such that the location indicators are depicted in a constant position even as the POV or frame of the rendered 3D scene changes.

Figure 4A:
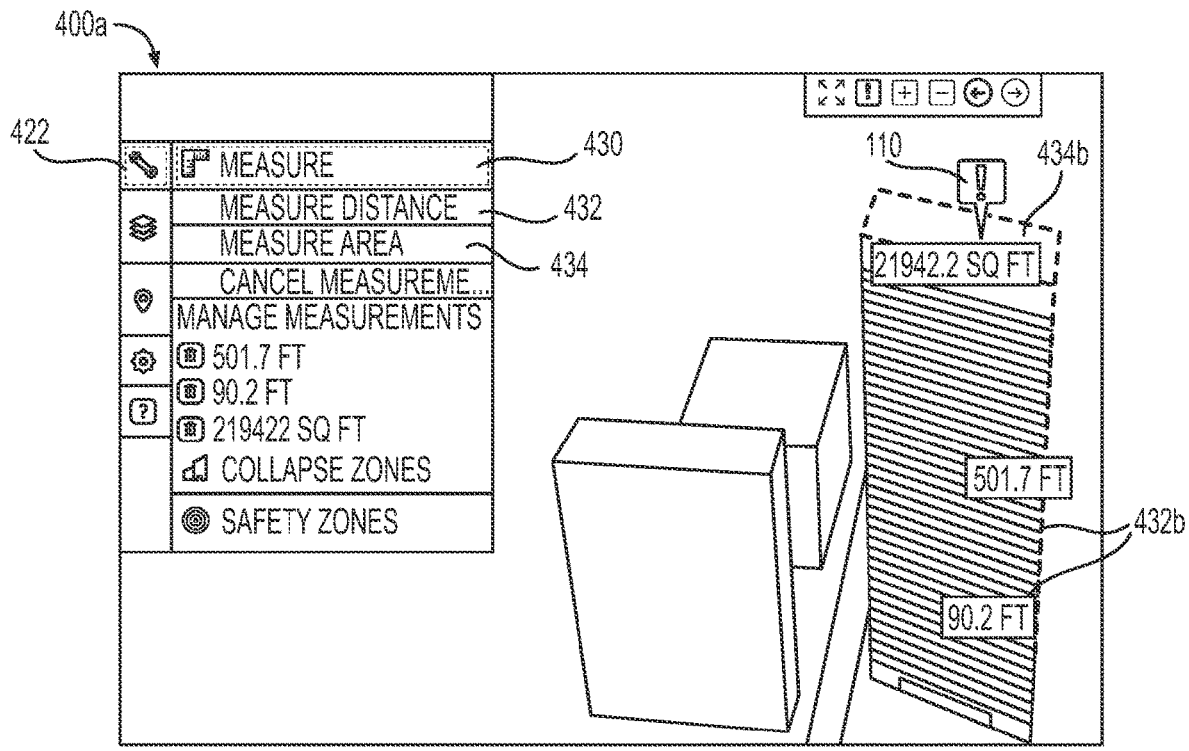
FIG. 4A is a diagram illustrating an example user interface including a measurement tool that can be used to overlay one or more true-to-scale measurements on a rendered 3D view of an incident scene, according to embodiments of the present disclosure.

FIG. 4A is a diagram illustrating an example user interface 400a including a measurement tool that can be used to overlay one or more true-to-scale measurements on a rendered 3D view of an incident scene, according to some example embodiments of the present disclosure. For example, a measurement tool 430 can be included as a sub-menu option of an annotation UI element 422. In one illustrative example, the measurement tool 430 (e.g., also referred to as a measurement interface) can include sub-options (e.g., sub-interfaces) for 'Measure Distance' and 'Measure Area', among others.

In some embodiments, a 'Measure Distance' UI element 432 can be selected and utilized to determine one or more straight-line distances drawn by the user on top of the rendered 3D scene presented in the example user interface 400a. For example, a user can select two or more points freely within the rendered 3D scene and use the distance measuring UI element 432 to automatically calculate or otherwise determine the distance between the selected points. In some cases, the distance measuring UI element 432 can provide a total distance for each line drawn and/or can provide a distance of each constituent line segment included in a multi-segment line drawn by the user. As illustrated, the distance measuring UI element 432 can be used to annotate (e.g., overlay) the rendered 3D view with one or more measurement lines 432b. For example, the measurement lines 432b include a vertical measurement line (e.g., reading '501.7 ft') and a horizontal measurement line (e.g., reading '90.2 ft').

Figure 4B:
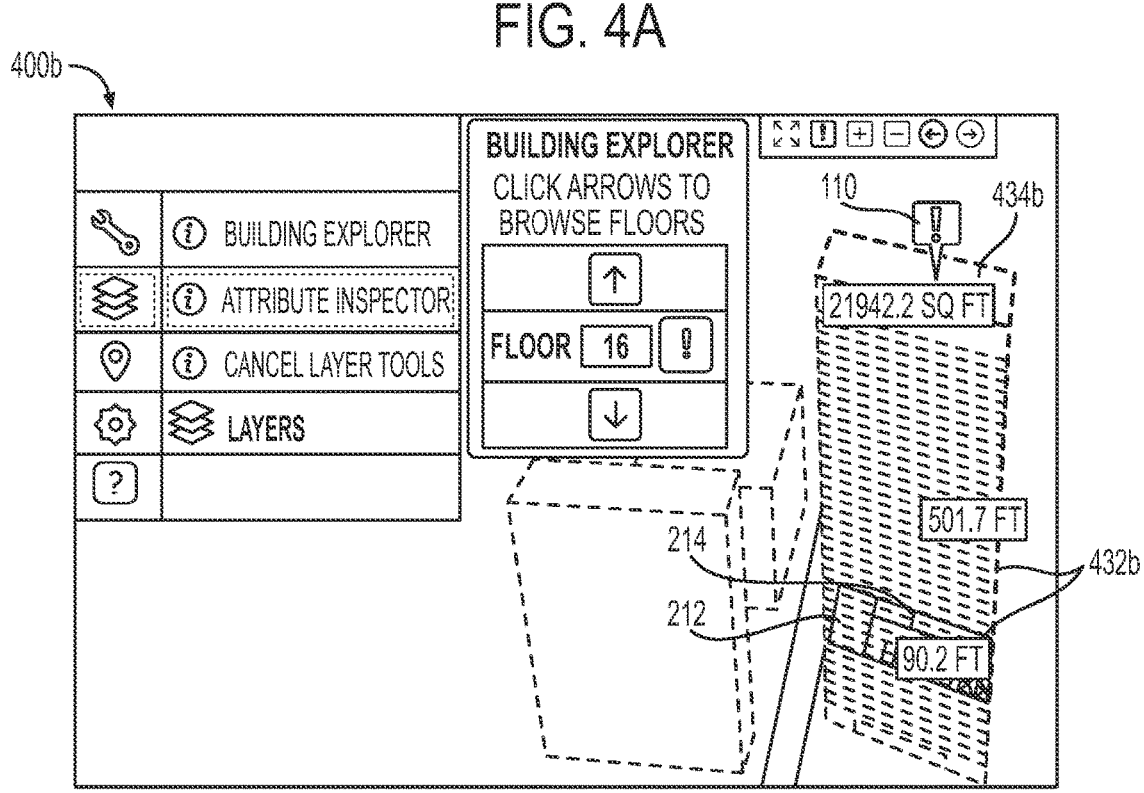
FIG. 4B is a diagram illustrating an example user interface presenting a semi-transparent view of the rendered 3D view depicted in FIG. 4A, according to embodiments of the present disclosure.

In some example embodiments, the measurement lines 432b can measure a distance from the 3D location of the reported incident to one or more exterior surfaces of the building in which the report incident is located. For example, FIG. 4B is a diagram illustrating an example user interface 400b presenting a semi-transparent view of the rendered 3D view depicted in FIG. 4A. As illustrated, the measurement lines 432b can indicate a vertical distance between the height of the 3D location of the incident (e.g., the height of the fine-grained incident location indicator 214) and the top of the building and a horizontal distance between the 3D location of the incident and the right-side face of the building. In some examples, one or more (or both) of the measurement lines 432b can be automatically generated by the systems and techniques described herein. For example, the measurement lines 432b can be automatically generated in response to user selection of the measurement tool 430 and/or the measure distance tool 432. In some embodiments, one or more measurement lines can be automatically generated to indicate pre-determined measurements configured by the user.

For example, based on selecting the measure distance tool 432, the systems and techniques can automatically generate one or more measurements included in a set of pre-defined measurements selected by the user (e.g., height of incident location from the ground, height of incident location from the top of the building, x-displacement of the incident location relative to one or more walls of the building, y-displacement of the incident location relative to one or more walls of the building, etc.) In some embodiments, a user can define and save one or more measurements for quick access, wherein one or more UI elements are rendered corresponding to the user defined measurement rules or measurement configurations. In some embodiments, the measurement lines can be drawn parallel to one of the three axes of the rendered 3D view (e.g., parallel to the x-axis, y-axis, or z-axis). In some examples, the measurement lines can be drawn as lines that span multiple ones (or all) of the three axes of the rendered 3D view.

In some embodiments, a 'Measure Area' UI element 434 can be selected and utilized to determine one or more planar (e.g., 2D) areas drawn by the user on top of the rendered 3D scene presented in the example user interfaces 400a, 400b. For example, a user can select three or more points freely within the rendered 3D scene and use the area measuring UI element 434 to automatically calculate or otherwise determine the area enclosed by the line connecting each of the selected points. In some embodiments, a user can select one or more pre-defined shape types such as 2D polygons (e.g., square, rectangle, circle, ellipse, triangle, etc.) and drag one or more handles and/or vertices to adjust the shape and area enclosed by the pre-defined shape. In some cases, the area measuring UI element 434 can provide a dynamically calculated area enclosed by an area drawn by or otherwise indicated by the user. As illustrated, the area measuring UI element 434 can be used to annotate (e.g., overlay) the rendered 3D view with one or more area measurement bounding boxes 434*b*. For example, the area measurement bounding box 434*b* indicates a measured area of '21942.2 sq ft' for the roof of the building associated with the emergency location indicators 110 and 214.

In some embodiments, the distance measuring UI element 432 and/or the area measuring UI element 434 can calculate distances, areas, etc., that are accurate to the real-world, physical dimensions of the user annotation being measured. For instance, the systems and techniques can include dimension and/or scaling information associated with the buildings included in the 3D scene (e.g., used to render a correct relative scale between buildings and/or used to render different zoom levels of various 3D frames of the overall or underlying 3D scene). In some examples, the distance measuring UI element 432 can automatically determine one or more pre-defined area types (e.g., in response to user selection of the area measuring element 434). For instance, the distance measuring UI element 432 can automatically determine one or more pre-defined area measurements such as an area of a roof of the building in which an incident is located, an area of a footprint of the building in which an incident is located, an area of the specific floor 212 of the building in which an incident is located, etc. In some embodiments, one or more area measurement bounding boxes can be automatically generated to indicate and/or determined one or more pre-determined area measurements configured by the user. In some embodiments, a user can define and save one or more area measurements for quick access, wherein one or more UI elements are rendered corresponding to the user defined area measurement rules or area measurement configurations. In some embodiments, area measurements can be performed for 2D (e.g., planar) surfaces that area parallel to (e.g., coplanar with) one of the three axes (e.g., x-axis, y-axis, z-axis) included in the rendered 3D view. In some embodiments, area measurements can be performed for any 2D or planar surface that is present in or can be drawn in the rendered 3D view.

Figure 5A:
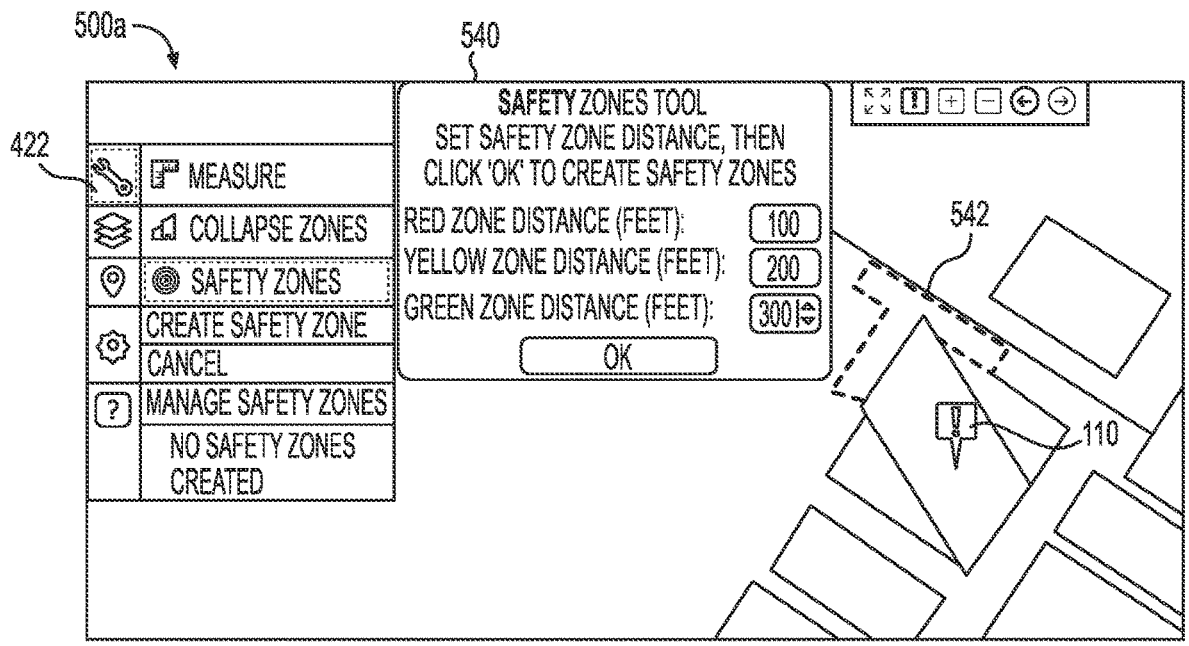
FIGS. 5A-C are diagrams illustrating example user interfaces including an automatically rendered safety zone overlay, according to embodiments of the present disclosure.
Figure 5B:
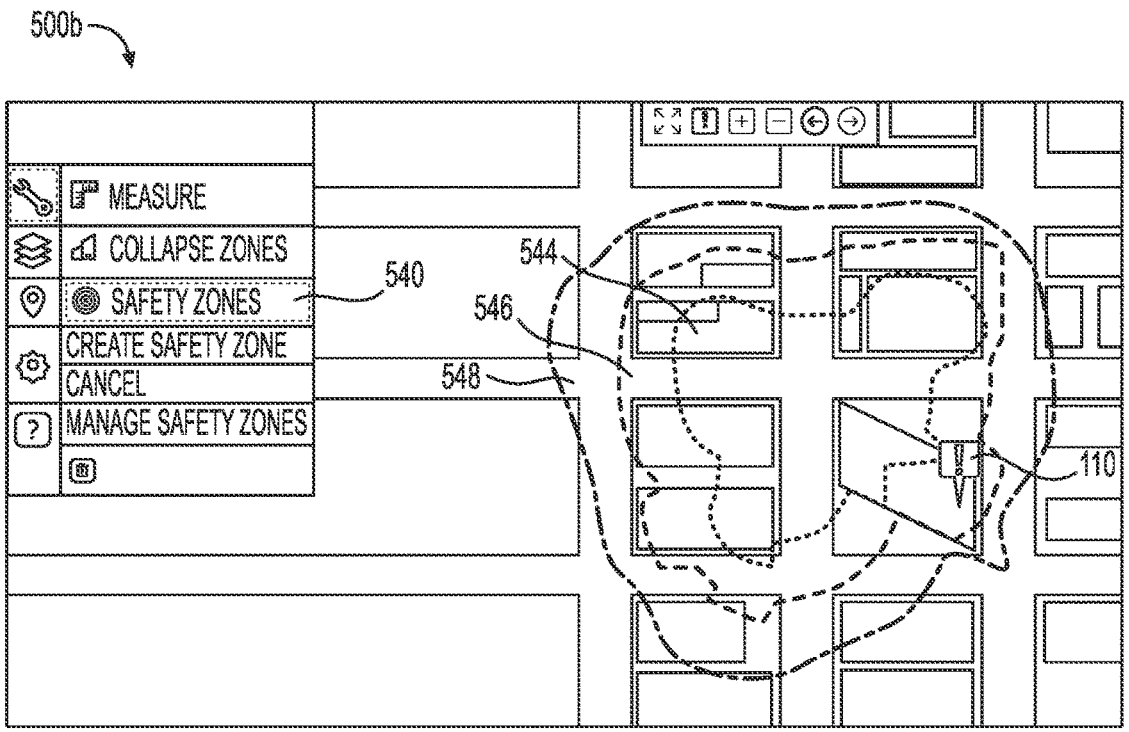
Figure 5C:
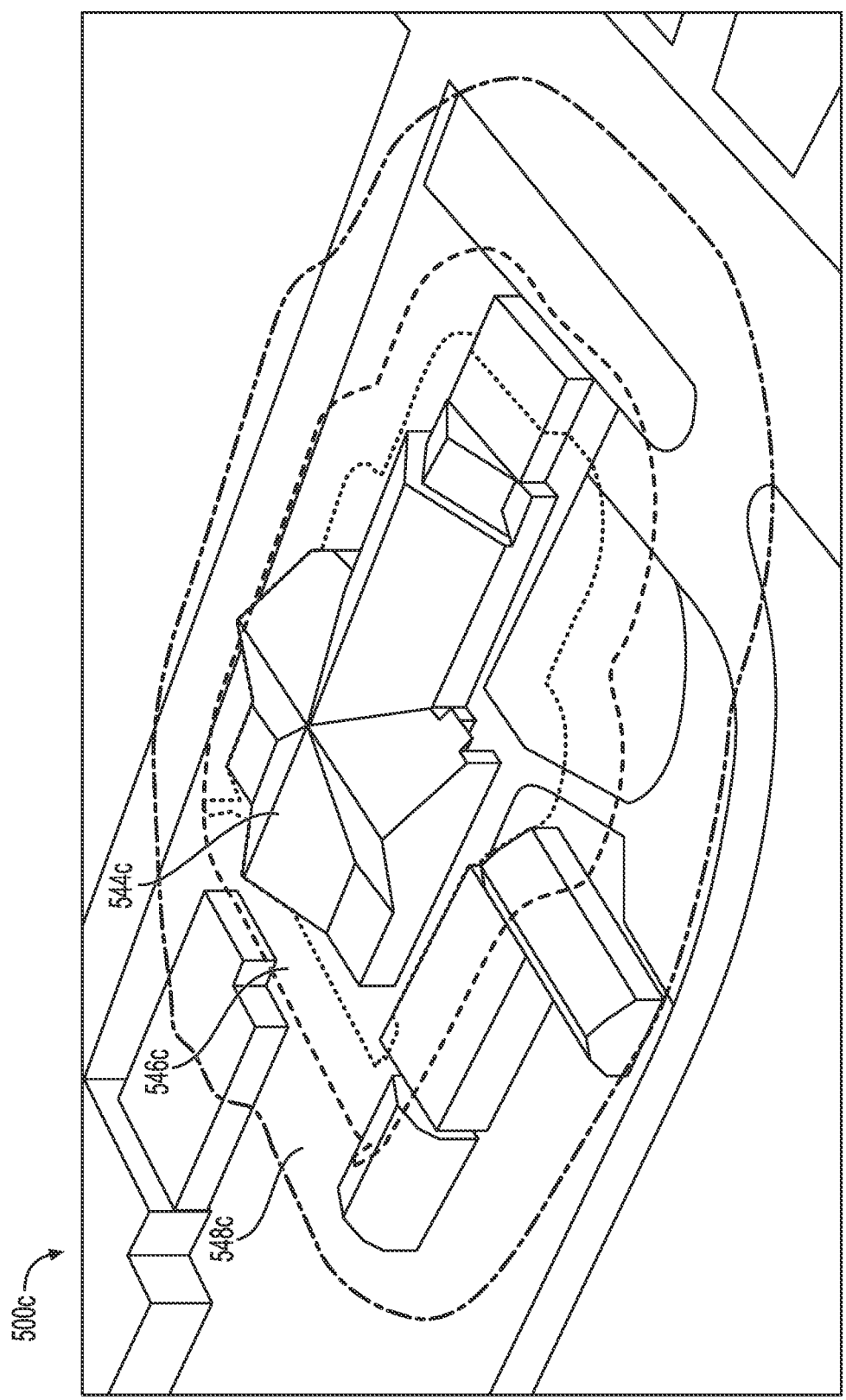

FIGS. 5A-C are diagrams illustrating example user interfaces including an automatically rendered safety zone overlay, according to some embodiments of the present disclosure. For example, FIG. 5A is a diagram illustrating an example user interface 500*a* of a safety zone annotation interface 540; FIG. 5B is a diagram illustrating an example user interface 500*b* that includes automatically generated safety zone annotations/overlays 544, 546, 548 that can be generated based on the inputs to the safety zone annotation interface 540 illustrated in FIG. 5A; and FIG. 5C is a diagram illustrating an example user interface 500*c* of another automatically generated safety zone annotation/overlay set 544*c*, 546*c*, 548*c*.

For example, a safety zone annotation tool can be included as a sub-menu option of the previously described annotation UI element 422. In one illustrative example, the safety zone annotation tool can include sub-options (e.g., sub-interfaces) for 'Create Safety Zone' and 'Cancel.' In some embodiments, the safety zone annotation tool can further include sub-options (e.g., sub-interfaces) for 'Manage Safety Zones,' with which previously created safety zones can be saved and selected for viewing (e.g., selection of a saved safety zone under the 'Manage Safety Zone' sub-interface can automatically zoom or fly the example user interface(s) 500*a*, 500*b* to an appropriately zoomed view of the selected saved safety zone).

In one illustrative example, selection of the 'Safety Zones' option, and more particularly, the 'Create Safety Zone' sub-option, can trigger the display or presentation (e.g., to the user) of the safety zone interface 540. Safety zone interface 540 can present a 'Safety Zones Tool' with which a user can configure one or more parameters for automatically generating a set of safety zones. For example, as illustrated in FIG. 5A, the safety zone interface 540 can include one or more user input fields to specify a distance/radius (e.g., from a central point or safety zone) at which three different safety zones should begin or extend to. Hereinafter, central point is understood to encompass a single point and a defined area, such as the example central point 542 in FIG. 5A. For instance, a Red safety zone can be configured to extend to a distance of 100 ft from a central point or safety zone; a Yellow safety zone can be configured to extend from the edge of the Red safety zone to a distance of 200 feet from the central point (e.g., from 100 ft from the central point to 200 ft from the central point); and a Green safety zone can be configured to extend from the edge of the Yellow safety zone to a distance of 300 ft from the central point (e.g., from 200 ft from the central point to 300 ft from the central point). While a single central point (i.e., a dot) would lead to red, yellow, and green safety zones defining a circle, a central point in the form of a safety zone as shown in FIG. 5A, will lead to irregularly shaped red, yellow, and green safety zones. The need for alternatively shaped safety zones depends on the situation at hand and may be automatically defined or altered by a user.

In some embodiments, the central point about which one or more safety zones can be automatically generated may be user-defined (e.g., by selecting the central point at a desired location within the rendered 3D view). In some cases, the central point about which the one or more safety zones are automatically generated can be automatically defined (e.g., having the same (x, y) coordinates as the location of the reported incident, having the same (x, y) coordinates as the location of the reported incident plus one or more offsets, etc.).

In some embodiments, one or more of a quantity of different safety zones (e.g., three safety zones are shown in the examples of FIGS. 5A-C) can be user configurable, automatically determined, and/or a combination of the two. Similarly, one or more (or all) of the configured boundary distances associated with defining the respective safety zones may be user configurable and/or automatically determined. In some embodiments, one or more safety zones can be automatically generated and rendered, using automatically or pre-determined boundary distances for defining each safety zone (e.g., selection of 'Create Safety Zone' can automatically result in the generation and rendering of the three safety zones 544, 546, 548 depicted in FIG. 5B, without performing the intermediate UI rendering seen in FIG. 5A). In other examples, the safety zones of FIG. 5B can be automatically generated and rendered, with the user given an option to edit one or more (or all) of the safety zone boundary distance definitions and/or the quantity of safety zones, using the safety zone interface 540 (e.g., selection of 'Create Safety Zone' can automatically result in the generation and rendering of the three safety zones 544, 546, 548 depicted in FIG. 5B, with the user having an option to use the safety zone creation/modification interface 540 illustrated in FIG. 5A to adjust one or more (or all) of the three automatically generated safety zones as desired).

In some embodiments, the safety zone interface 540 can be used to automatically generate a plurality of safety zones that are defined with respect to a single central point. For example, the boundary distance definitions can define the radii of concentric circles (e.g., one for each defined safety zone) centered on the single central point. In some embodiments, the safety zone interface 540 can be used to automatically generate a plurality of safety zones that are defined with respect to an arbitrarily drawn base safety zone shape, such as a 2D shape or polygon. For example, the safety zones 544, 546, and 548 illustrated in FIG. 5B can be generated based on applying the respective boundary distance definitions (e.g., 100 ft, 200 ft, and 300 ft) to the safety zone annotation 542 illustrated in FIG. 5A. For example, the first (e.g., red) safety zone 544 can be generated to enclose the area/set of points that is within 100 ft or less from any point located along the line of safety zone annotation 542; the second (e.g., yellow) safety zone 546 can be generated to enclose the area/set of points that is greater than 100 ft but less than or equal to 200 feet from any point located along the line of safety zone annotation 542; and the third (e.g., green) safety zone 548 can be generated to enclose the area/set of points that is greater than 200 ft but less than or equal to 300 feet from any point located along the line of safety zone annotation 542.

FIG. 5C is a diagram illustrating an example user interface 500c of another automatically generated safety zone annotation/overlay set 544c, 546c, 548c, according to some example embodiments of the present disclosure. For example, whereas FIGS. 5A and 5B illustrated a set of automatically generated safety zones 544, 546, 548 overlaid on an urban/high verticality environment, the example of FIG. 5C illustrates a set of automatically generated safety zones 544c, 546c, 548c overlaid on a suburban/low verticality environment consisting of single-family homes and structures generally having three floors or less.

In some embodiments, the three automatically generated safety zones 544c, 546c, 548c can be generated and/or configured using the safety zone interface 540 illustrated in FIG. 5A. In some embodiments, the three automatically generated safety zones 544c, 546c, 548c illustrated in FIG. 5C can be generated to have a smaller footprint or overall size and/or boundary distance definitions compared to the safety zones 544, 546, 548 illustrated in FIG. 5B. For instance, an inner (e.g., red) safety zone 544c can be generated or otherwise configured to have a size and extent that approximately corresponds to the footprint of the building about which the safety zones 544c, 546c, 548c are centered. In some embodiments, the inner (e.g., red) safety zone 544c can be generated or otherwise configured to have a size or extent that corresponds to the footprint of the central building plus a pre-determined offset (e.g., 50 ft) from the boundary of the central building's footprint.

In some examples, an inner (e.g., red) safety zone, such as the safety zones 544 and 544c, can be defined to create a safety zone in which first responders and/or other emergency response personnel and resources are actively engaged. An intermediate (e.g., yellow) safety zone, such as the safety zones 546 and 546c, can be defined to create a safety zone that acts as a buffer around the inner (e.g., red) safety zone 544, 544c in which first responders and emergency response resources are engaged. For instance, the intermediate (e.g., yellow) safety zone 546, 546c can act as a buffer between the inner (e.g., red) safety zone 544, 544c and an outer (e.g., green) safety zone 548, 548c. In some embodiments, the outer (e.g., green) safety zone 548, 548c can be used to stage emergency response resources, triage, or treat victims, etc. In some embodiments, an outer (e.g., green) safety zone 548, 548c can define an outermost extent of a crowd control area, the boundaries of which onlookers/the public will be prevented from entering during the course of the emergency response. Various other configurations and combinations of safety zones (e.g., in various quantities, sizes, shapes, etc.) can also be utilized, for various other purposes, without departing from the scope of the present disclosure.

Figure 6A:
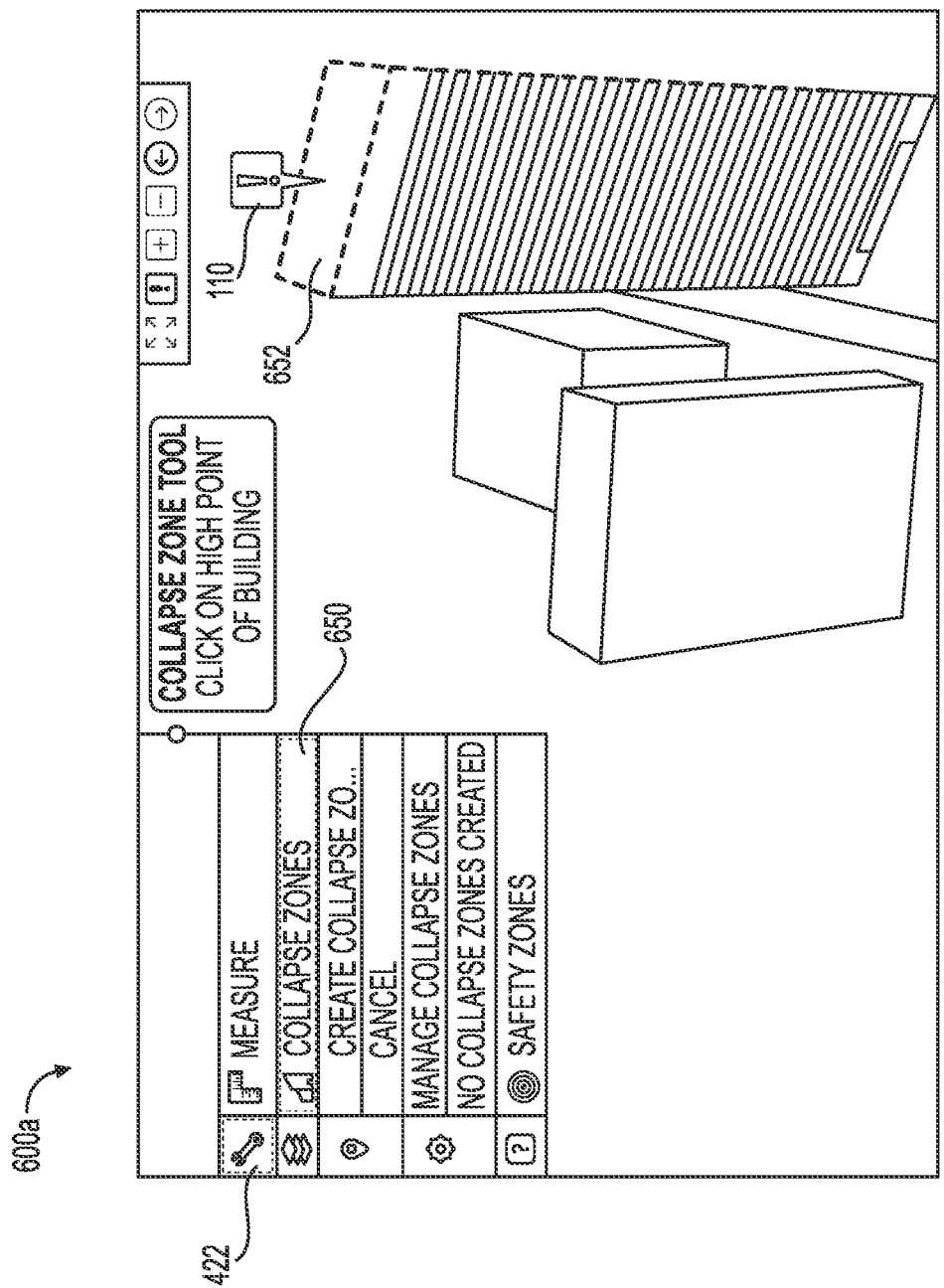
FIGS. 6A-D are diagrams illustrating example user interfaces including an automatically rendered collapse zone overlay, according to embodiments of the present disclosure.
Figure 6B:
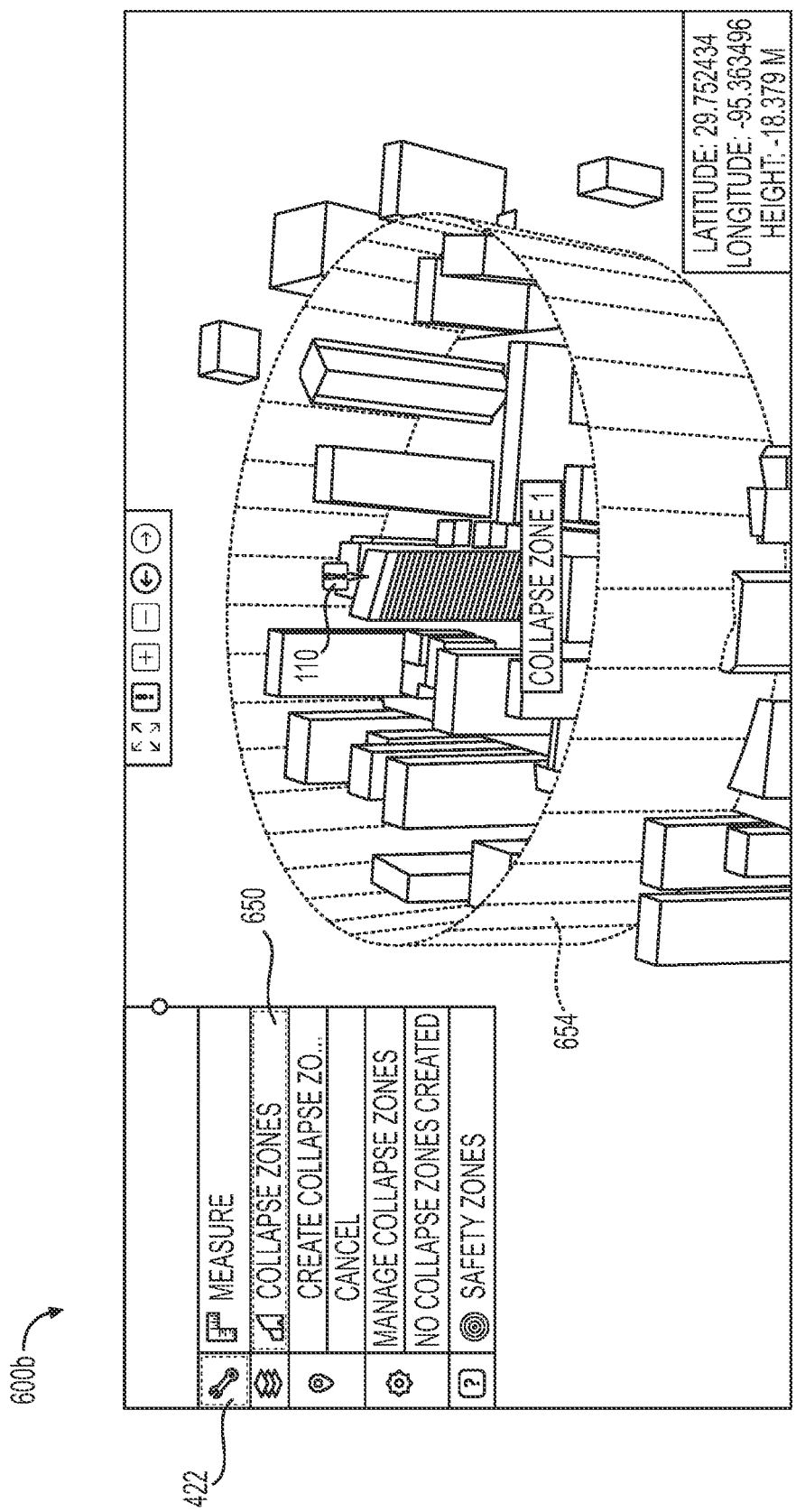
Figure 6C:
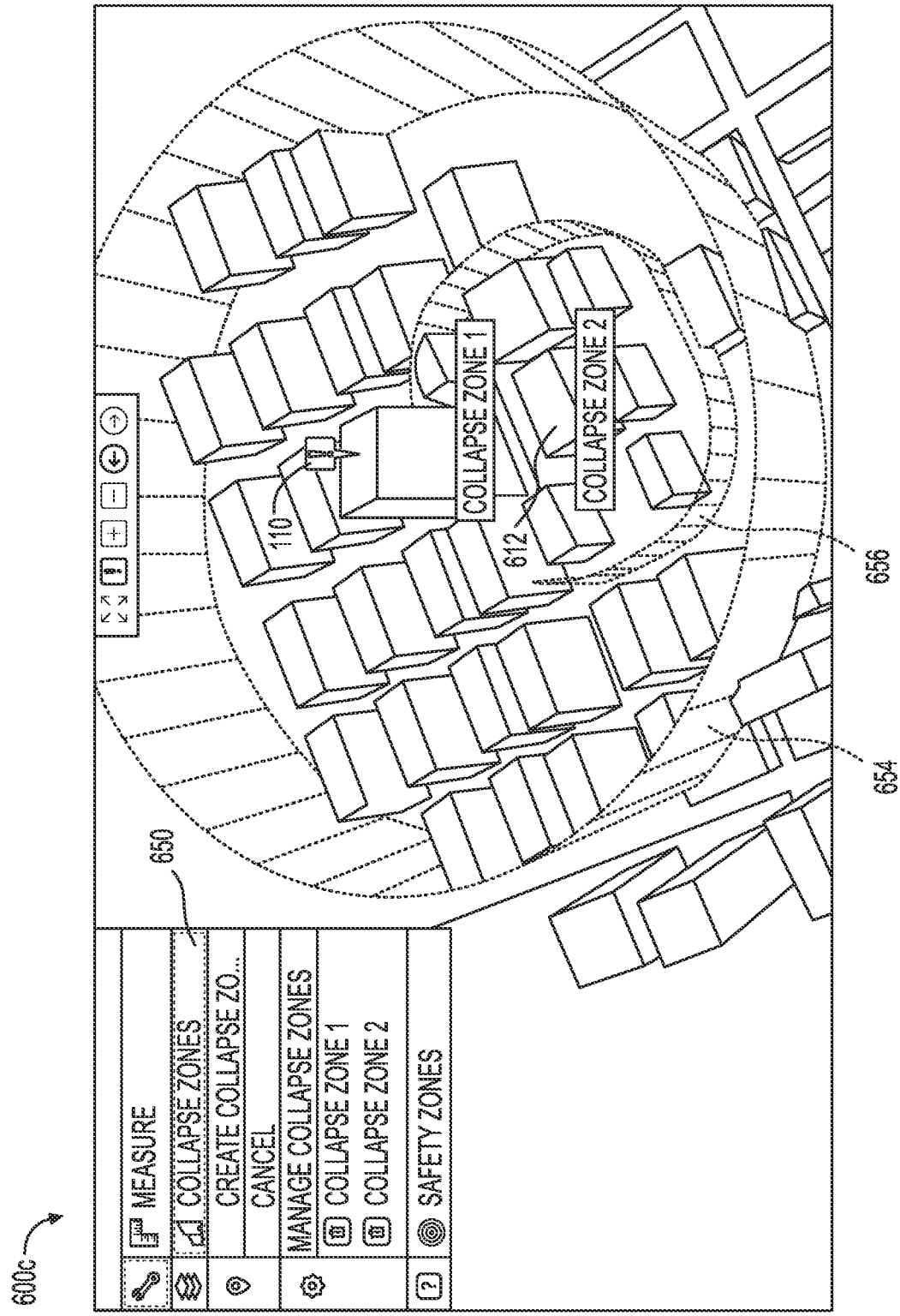
Figure 6D:
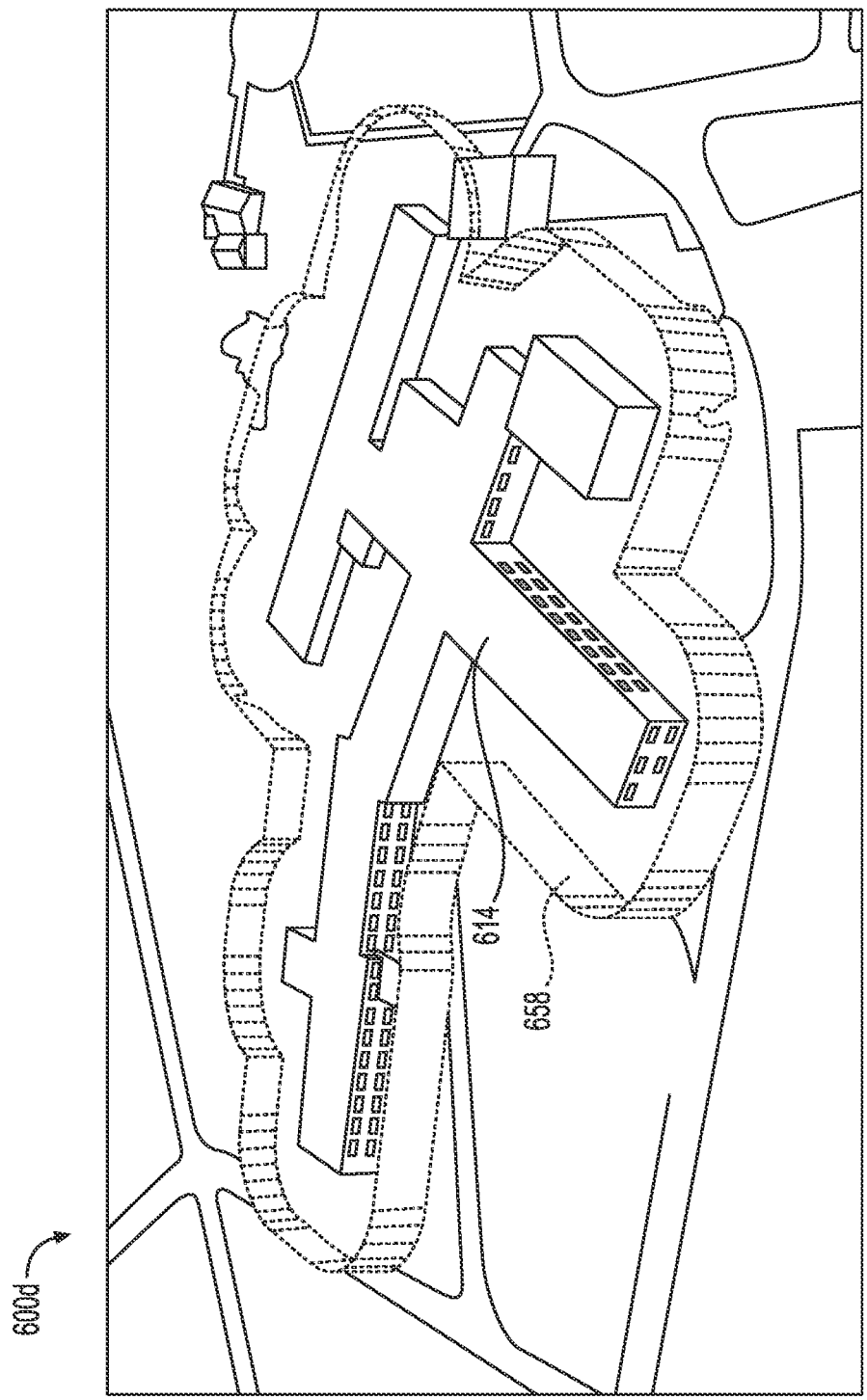

FIGS. 6A-D are diagrams illustrating example user interfaces including an automatically rendered collapse zone overlay, according to some example embodiments of the present disclosure. For example, FIG. 6A is a diagram illustrating an example user interface 600a of a collapse zone annotation interface 650; FIG. 6B is a diagram illustrating an example user interface 600b that includes automatically generated collapse zone annotation/overlay 654; FIG. 6C is a diagram illustrating an example user interface 600c that includes a first automatically generated collapse zone annotation/overlay 654 and a second automatically generated collapse zone annotation/overlay 656; and FIG. 6D is a diagram illustrating an example user interface 600d that includes automatically generated collapse zone annotation/overlay 658.

For example, a collapse zone annotation tool can be included as a sub-menu option of the previously described annotation UI element 422 (e.g., the collapse zone annotation tool of FIGS. 6A-D and the safety zone annotation tool of FIGS. 5A-C can both be included as sub-menu options of the previously described annotation UI element 422). In one illustrative example, the collapse zone annotation tool can include sub-options (e.g., sub-interfaces) for 'Create Collapse Zone' and 'Cancel.' In some example embodiments, the collapse zone annotation tool can further include sub-options (e.g., sub-interfaces) for 'Manage Collapse Zones,' with which previously created collapse zones can be saved and selected for viewing (e.g., selection of a saved collapse zone under the 'Manage Collapse Zone' sub-interface can automatically zoom or fly the example user interface(s) 600a, 600b, 600c, and/or 600d to an appropriately zoomed view of the selected saved collapse zone.

In one illustrative example, a collapse zone can be generated to represent a base collapse zone shape, such as a 2D or planar surface (e.g., along the ground surface of the rendered 3D view or scene) that should be evacuated in response to a possible collapse event or the threat of a collapse event. A collapse event may occur when a building collapses either partially or wholly, in any direction. In some embodiments, a collapse zone can be calculated as a circular area centered on the building being analyzed for a potential collapse event. The radius of the circular collapse zone area can be defined or otherwise determined according to a pre-determined logic. For example, in some embodiments the radius of the circular collapse zone can be determined as being equal to between 0.5 and 4, preferably between 0.8 and 3, more preferably between 1 and 2, still more preferably about 1.5 times the maximum height of the building, although it is noted that other collapse zone shapes, geometries, and/or sizes may also be utilized without departing from the scope of the present disclosure.

In one illustrative example, selection of the 'Collapse Zones' option, and more particularly, the 'Create Collapse Zone' sub-option, can trigger the display or presentation (e.g., to the user) of the collapse zone interface 650. Collapse zone interface 650 can present a 'Collapse Zone Tool' with which a user can configure one or more parameters for automatically generating one or more collapse zones. For example, as illustrated in FIG. 5A, the collapse zone interface 650 can include one or more user prompts or instructions for creating a collapse zone. In some embodiments, a collapse zone can be automatically generated and rendered (e.g., overlaid on the rendered 3D view presented in the example user interface 600a, 600b, 600c, and/or 600d) based on receiving a user input specifying a high point of a building that is to be used to generate the collapse zone. For example, based on the data, preferably user input, of the selected high point, the systems and techniques described herein can correlate the selected point to a building and/or to a specific height. In some examples, the height used to calculate the collapse zone (e.g., recalling that the collapse zone can be a circle center on the building and having a radius of between 0.5 and 4, preferably between 0.8 and 3, more preferably between 1 and 2, still more preferably about 1.5 times the maximum height of the building) can be the height associated with the selected point input by the user. In some instances, the height used to calculate the collapse zone can be an automatically determined maximum height for a building identified based on correlating the select point input by the user to existing map data/a database of buildings.

As illustrated, in some embodiments the systems and techniques can automatically generate and display (e.g., overlay) a collapse zone selection area 652 based on a selected input point for calculating the collapse zone (e.g., based on the user input of a selected high point of a building for which the collapse zone should be calculated). In some embodiments, the collapse zone selection area 652 can enclose or correspond to the area of a roof or top of the building for which the selected high point was obtained.

In some embodiments, the central point or area about which the collapse zone can be automatically generated may be user-defined (e.g., by selecting the high point at a desired location within the rendered 3D view). In some cases, the high point that is used to automatically generate a collapse zone can be automatically defined based on a user selection of a building. A user may select a building by clicking on or otherwise selecting the building, dragging a bounding box around the building, typing in an address or coordinate of the building, a name of the building, etc. In some embodiments, one or more (or both) of a collapse zone and/or one or more sets of safety zones (e.g., as illustrated and described above with respect to FIGS. 5A-C) can be automatically generated based on the reported location of a given incident. For example, in response to receiving location information and/or other information associated with a reported incident or emergency, the systems and techniques described herein can automatically determine a central point and/or safety zone area for generating one or more safety zones and can automatically determine a building and/or associated high point for generating one or more collapse zones. In some embodiments, the systems and techniques can analyze additional information associated with a reported incident or emergency to determine a type or configuration of safety zones that should be generated (e.g., an active shooting might require a larger set of safety zones and/or multiple safety zones, as compared to a slip and fall medical emergency). The systems and techniques can additionally, or alternatively, analyze additional information associated with the reported incident or emergency to determine whether a collapse zone is appropriate or should be generated. For example, for a building file, earthquake, bombing, or other emergency event that may affect the structural integrity of a building, a collapse zone can be automatically generated and/or rendered in response to receiving the location information and additional information of the reported emergency event. Other emergency events may be determined not to present a structural or collapse event risk (e.g., a robbery, medical event, etc.), in which case a collapse zone may not be automatically generated or rendered. In some embodiments, the generation of safety zones and/or collapse zones may be based on non-emergency situations, such as parades, festivals, or other events.

FIG. 6B illustrates an example of a rendered 3D view that is overlaid with a collapse zone 654 automatically generated and overlaid based on a high point determined (or received from the user) for the building in which the emergency event associated with emergency indicator 110 is located or occurring. In some embodiments, the systems and techniques can connect to or utilize one or more databases of street level or addressing information, such that a listing of addresses, buildings, tenants, organizations, etc., that are included within the collapse zone 654 is automatically generated (in some embodiments, a same or similar listing can be generated for the addresses, etc., that are located within various ones of the safety zones illustrated in and described above with respect to FIGS. 5A-C). In some embodiments, the systems and techniques can automatically contact or generate and transmit notifications/emergency alerts to the identified addresses (e.g., and associated individuals, businesses, tenants, etc.) occupying those addresses. For example, when an address is determined to fall within collapse zone 654, an emergency or evacuation notification can automatically be transmitted ordering the affected individuals and business to evacuate. In some cases, the notifications can include information of the emergency, or additional emergency response guidelines or instructions (e.g., in the case of a collapse zone evacuation notification, the notification can include information customized to indicate the optimal direction of evacuation, e.g., in a direction of travel that is away from the building under threat of collapse).

In some embodiments, multiple collapse zones can be generated and displayed simultaneously. For example, FIG. 6C illustrates the collapse zone 654 of FIG. 6B combined with an additional collapse zone 656. The collapse zone 654 can be generated for and centered on the building in which the emergency event associated with emergency event indicator 110 is located; the additional collapse zone 656 can be generated for and centered on the building indicated in FIG. 6C at 612. In some embodiments, one or more additional collapse zones (e.g., such as the additional collapse zone 656) can be automatically generated for one or more buildings that are located within or enclosed by the collapse zone 654. For example, the additional collapse zone 656 can be automatically generated for building 612 being enclosed by collapse zone 654 (e.g., based on a possibility of a domino-effect multi building collapse, wherein the building associated with collapse zone 654 collapses into building 612 and triggers a secondary collapse (e.g., the secondary collapse event associated with additional collapse zone 656). In some embodiments, the generation of secondary or additional collapse zones (e.g., such as additional collapse zone 656) can be performed automatically, e.g., for any buildings within the initial collapse zone 654 that are above a predetermined height, within a certain minimum distance or radius of the building associated with emergency event indicator 110, etc. In some embodiments, the generation of secondary collapse zones can be a user-configurable parameter, wherein the user specifies the minimum height or distance from the primary collapse event building that triggers the generation and rendering of an additional collapse zone. In some embodiments, a user interface element can be included (not shown) that allows the user to display secondary or additional collapse zones with a single click. In some embodiments, the generation of secondary collapse zones can be performed automatically, based on an analysis of potential or most probable collapse dynamics or characteristics of the building associated with the primary collapse zone 654 and/or an analysis of the collapse vulnerability, characteristics, or risk profile of one or more buildings included in the primary collapse zone 654.

FIG. 6D is a diagram illustrating another example of an automatically generated collapse zone 658, depicted herein the context of a lower-density, lower verticality, suburban environment. For example, as opposed to the high-rise office buildings depicted in and described above with respect to the rendered 3D views presented in FIGS. 6A-C, the rendered 3D view of FIG. 6D corresponds to a low-rise (e.g., two-story) building 612. For example, the low-rise building 612 may be an apartment complex, a hospital or medical facility, a school, etc. Here, the collapse zone 658 can be generated based on a perimeter shape (e.g., footprint) of the low-rise building 612, such that the collapse zone 658 follows the perimeter shape of low-rise building 612 and is offset from the perimeter of low-rise building 612 by either a pre-determined distance or a distance determined based on a maximum height of the low-rise building 612. For example, the collapse zone 658 can be generated by adding 1.5 times the maximum height of low-rise building 612 to the perimeter shape (e.g., footprint) of low-rise building 612. In some embodiments, one or more (or all) of the collapse zones described herein can be generated or otherwise calculated based on the height and/or area of a base collapse zone shape, such as a polygon, drawn by the user on a portion of interest within the rendered 3D map view.

Figure 7A:
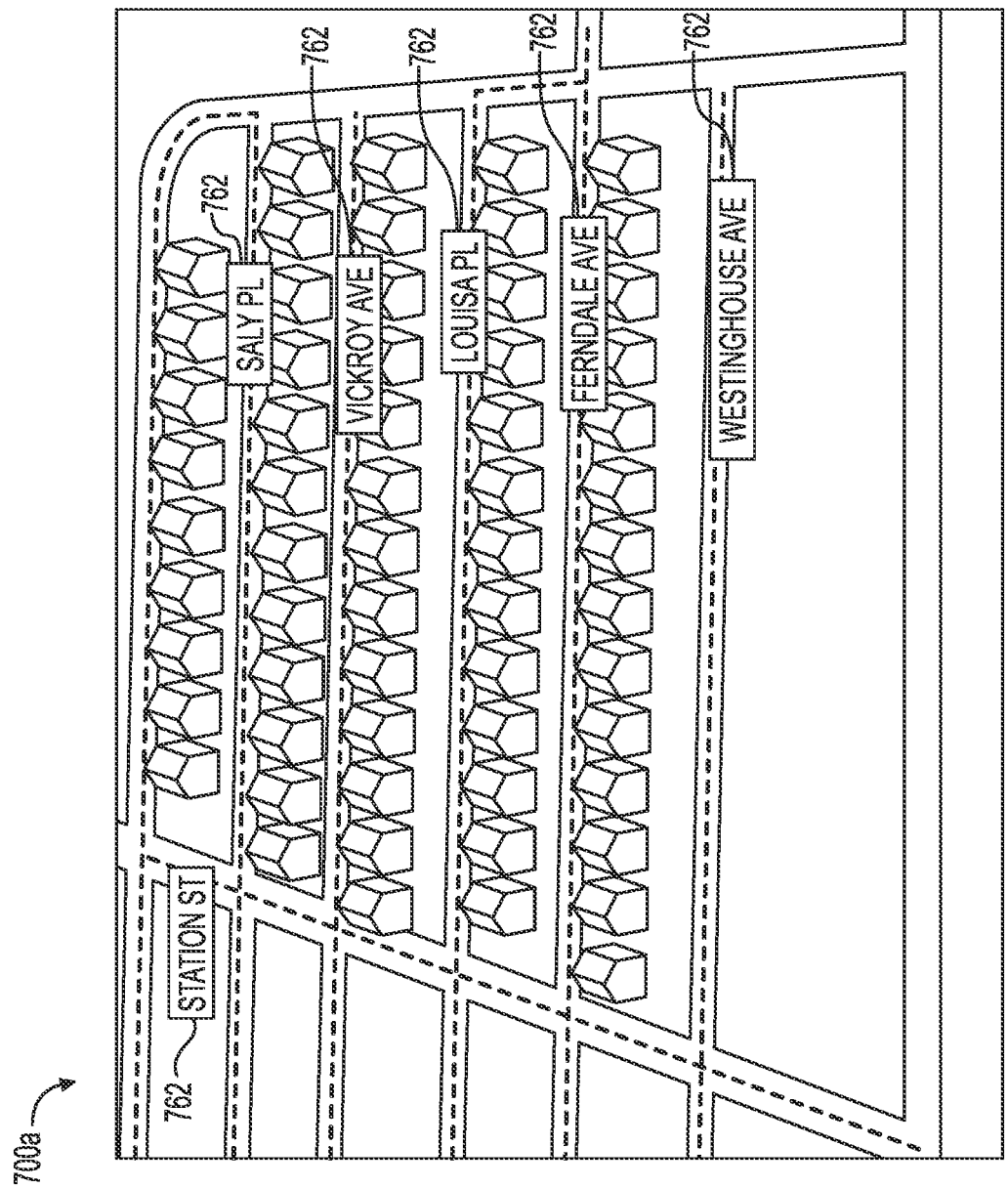
FIGS. 7A and 7B are diagrams illustrating example user interfaces including street-level information labels, according to embodiments of the present disclosure.
Figure 8:
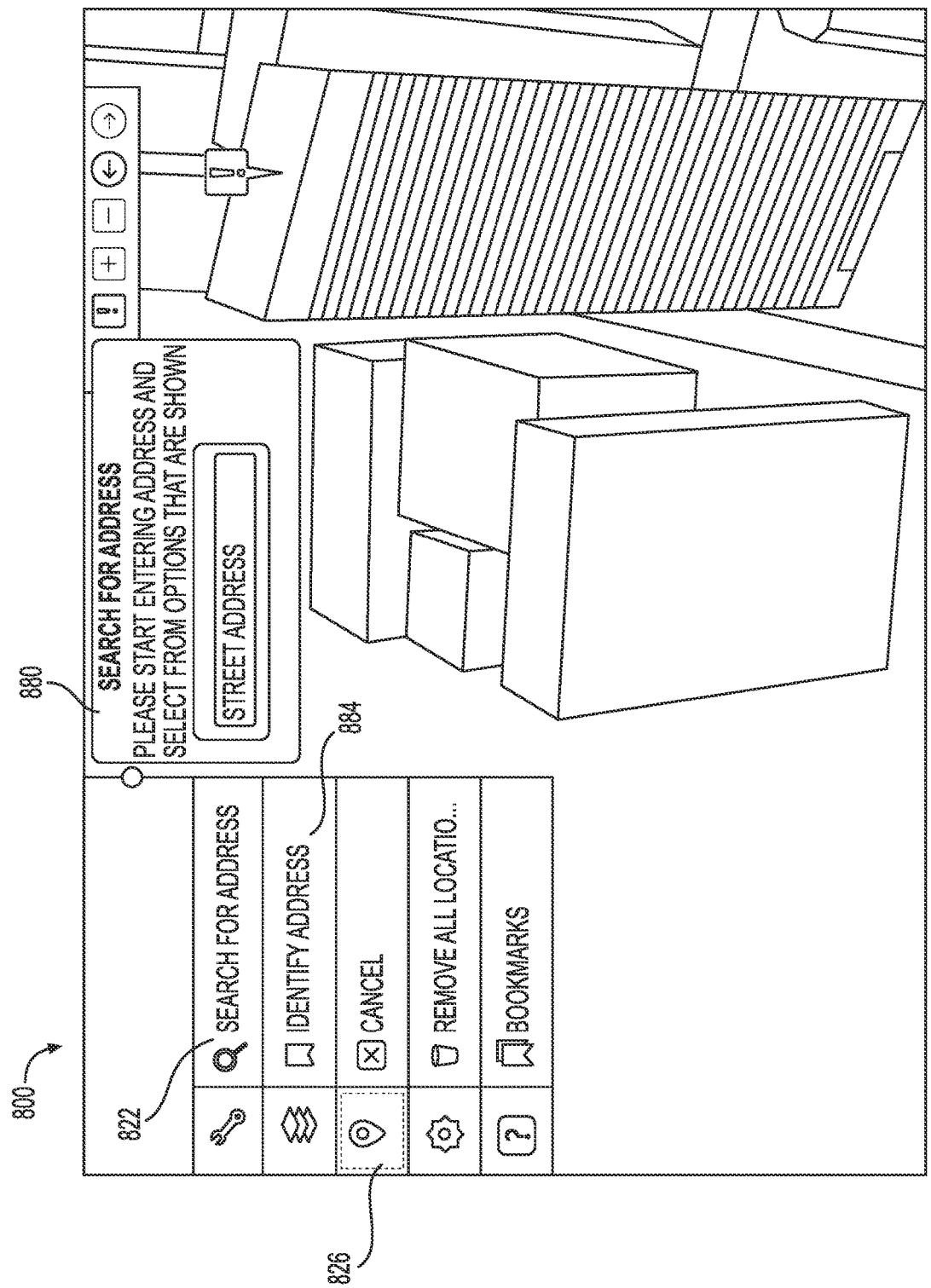
FIG. 8 is a diagram illustrating an example location identification and tagging user interface, according to embodiments of the present disclosure.

In some embodiments, the systems and techniques described herein can include a plurality of different layers and/or information sources that can be rendered or visualized in the 3D mapping view. For example, FIG. 7A is a diagram illustrating an example user interface 700a including street-level information labels 762, according to embodiments of the present disclosure. As illustrated, the rendered 3D view presented in user interface 700a can be overlaid with a plurality of street-level information labels 762, shown here as individual street name labels for each street that is visible in the currently rendered 3D view. In some examples, the street labels 762 can be toggled on or off as an additional overlay element (e.g., overlaid on aerial/satellite imagery, as depicted in FIG. 7A; overlaid on a simplified line drawing map view; overlaid on a terrain or topographic map view; etc.). In some embodiments, the street labels 762 can be included in a discrete layer. For example, in the context of FIG. 7A, the aerial/satellite imagery of the underlying rendered 3D view of map data can be included in a first layer and the plurality of street labels 762 can be included in a second layer. In some embodiments, layers can be individually controlled, modified, or adjusted. For example, a transparency or opacity of an upper layer (e.g., as opposed to a base layer, which may be the rendered 3D view of map data) can be adjusted to cause the upper layer to be shown in a semi-transparent or semi-opaque fashion. In some embodiments, one or more (or all) of the street labels 762 may be clickable or interactive. For example, clicking on a specific one of the plurality of street labels 762 can cause the field of few and/or zoom level of the rendered 3D view presented in user interface 700a to be automatically adjusted to show the full extent of the labeled street, to show a pre-determined portion of the labeled street, etc.

In some example embodiments, the presently disclosed systems and techniques for 3D mapping emergency response planning, visualization, and/or coordination can be communicatively coupled to a plurality of different data sources. For example, the systems and techniques can utilize a plurality of different databases each storing one or more types of map data. In some embodiments, the plurality of databases can store 3D map data, such that the stored 3D map data can be presented in the rendered 3D mapping view based on aligning a 3D coordinate system associated with the stored 3D map data with the 3D coordinate system used to generate the rendered 3D mapping view. In some cases, the plurality of databases may include one or more portions of 2D map data. 2D map data can be overlaid on the rendered 3D mapping view in a two-dimensional fashion. In some embodiments, 2D map data (e.g., such as street labels 762) can be overlaid on the rendered 3D mapping view by ignoring the missing third dimension (e.g., height/z-axis) or otherwise extending the 2D map data to a 3D format by setting the missing third dimension to an arbitrary value such as zero or the current ground level/elevation above sea level.

In one illustrative example, the systems and techniques can connect to a plurality of databases that include 2D and/or 3D mapping data and can generate various rendered 3D mapping views including one or more layers of rendered mapping data in substantially real-time. For instance, when a user selects or toggles on an additional layer (e.g., in addition to the base map layer, such as the aerial/satellite mapping view depicted in example user interface 700a), the corresponding mapping data associated with the additional layer can be retrieved in response to the user selection of the additional layer. After retrieving the corresponding mapping data, the retrieved mapping data may be rendered in substantially real time to generate an overlay comprising the additional layer. In other words, in response to a user selection of additional mapping information to display in the rendered 3D view, the systems and techniques can dynamically retrieve and render the corresponding map data associated with the current field of view and/or location depicted in the rendered 3D view. In some embodiments, the systems and techniques can dynamically retrieve and then cache one or more portions of map data (e.g., either of the underlying map view, of the additional layer(s), or both) corresponding to locations within the 3D scene that are adjacent to the location currently depicted in the rendered 3D view.

Figure 7B:
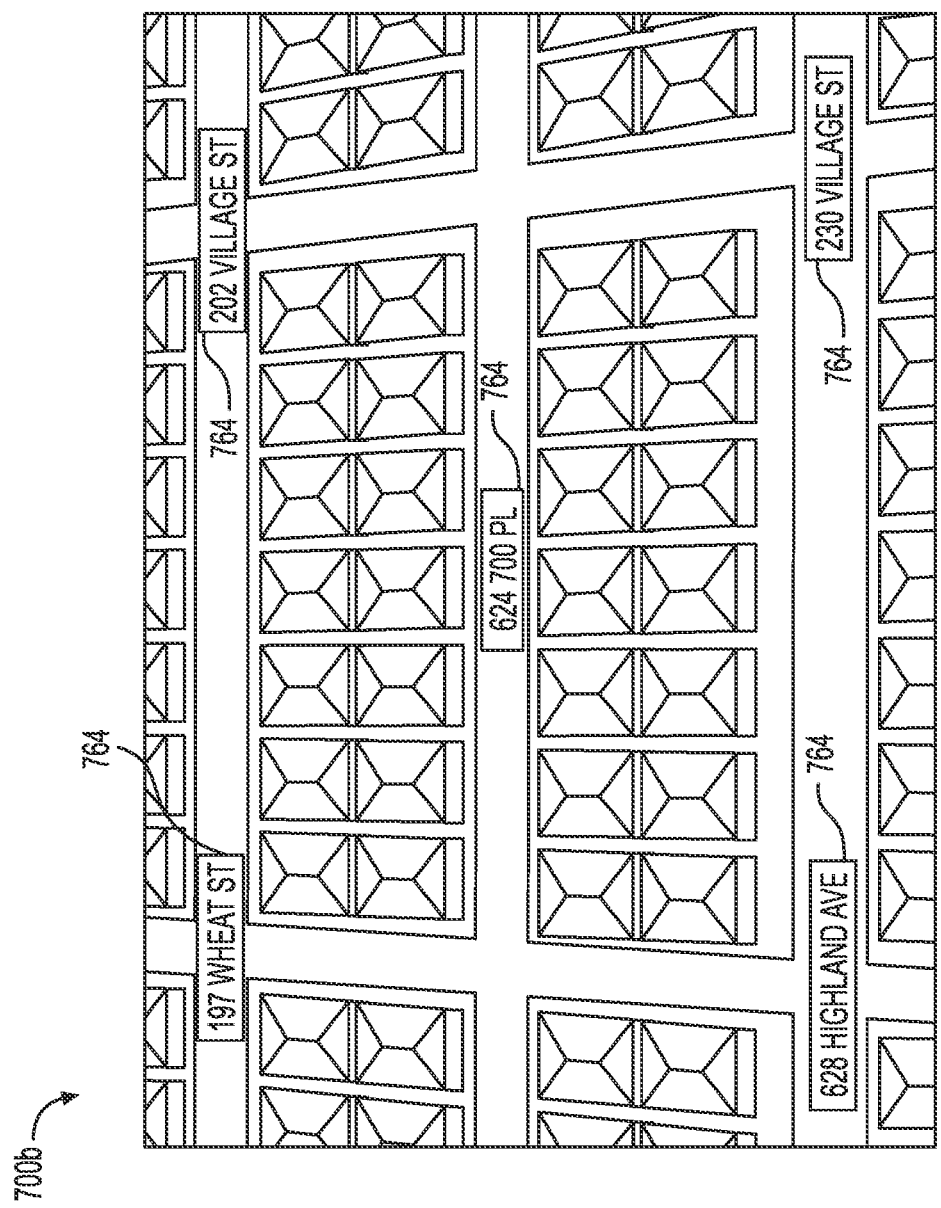

As described above, in some embodiments additional map layer information can be obtained from external sources and/or databases and overlaid on the one or more layers of the current rendered 3D view. In some embodiments, additional map layer information can be user-generated and/or automatically generated by the systems and techniques described herein, and for example may comprise one or more annotations or tags. For instance, FIG. 7B is a diagram illustrating an example user interface 700b including a plurality of location tags 764, according to example embodiments of the present disclosure. The plurality of location tags 764 can be manually generated (e.g., by one or more users), can be automatically generated, or both. In one illustrative example, the plurality of location tags 764 can correspond to or otherwise be associated with specific addresses (e.g., as illustrated in the example of FIG. 7B. In some embodiments, the location tags 764 can be utilized as saved bookmarks that provide a point of reference or navigation to a user of the example user interface 700b. For example, one or more UI elements can be provided, listing or otherwise display some or all of a user's set of saved location tags 762 or bookmarks. Selection of a particular location tag 762 or bookmark can cause the rendered 3D view to automatically fly to the location of the selected location tag 762 or bookmark, allowing the user to quickly change between viewing different locations and/or allowing the user to quickly access a rendered 3D view of frequently viewed locations.

As mentioned previously, in some embodiments, one or more location tags and/or bookmarks can be user-defined and user-generated. For example, as illustrated in the example user interface 800 of FIG. 8, the systems and techniques can include a location identification option 826 which includes sub-options for 'Search for Address' 882 and 'Identify Address' 884. In some examples, selection of the 'Search for Address' option 882 can trigger the presentation of a location search interface 880 that includes a text or other user input entry field that allows the user to specify one or more queries, full or partial addresses, search terms, etc. In some embodiments, selection of the 'Identify Address' option 884 can allow a user to select individual buildings or locations within the rendered 3D view presented in the user interface 800 (e.g., by clicking on, dragging a box around, etc., the desired building or location to be selected). After selecting the desired building or location, a saved location tag (e.g., such as one of the location tags 762 illustrated in FIG. 7B) and/or bookmark can be automatically generated and stored for future use by the user.

According to an aspect of the present invention, there is provided a method comprising the steps of: obtaining location information associated with an event; obtaining one or more portions of three-dimensional (3D) mapping data based on the location information associated with the event; generating a 3D scene associated with the event, wherein the 3D scene is generated based on the one or more portions of 3D mapping data; and rendering a first 3D view of the 3D scene, wherein the first 3D view includes one or more event location indicators representing the location information of the event relative to the 3D scene. An event can encompass parades, festivals, sport events or the like. It is noted that all embodiments described herein may be combined with this aspect of the invention.

Figure 9:
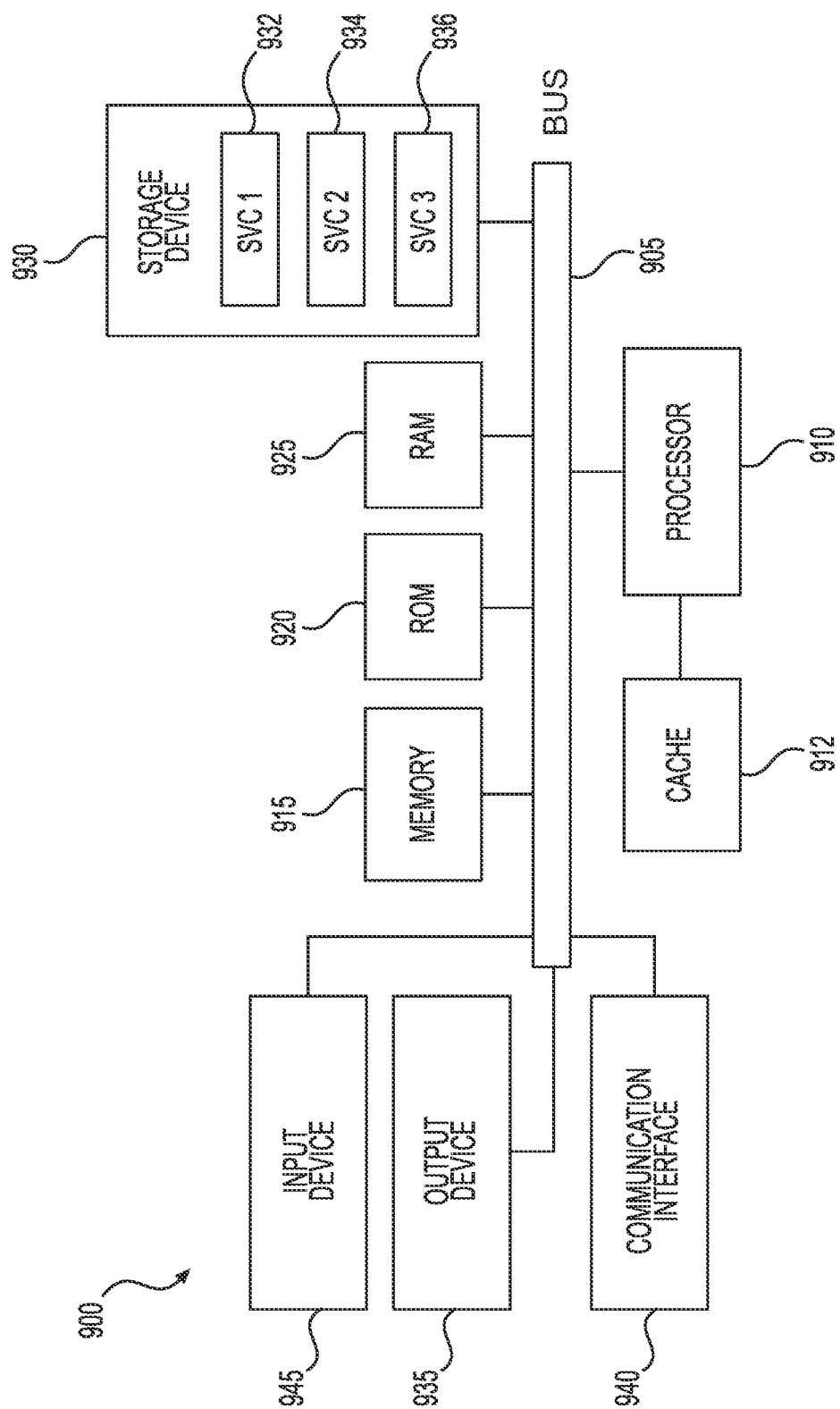
FIG. 9 illustrates an example system for implementing certain embodiments of the present technology, according to embodiments of the present disclosure.

FIG. 9 illustrates a computing system architecture, according to some embodiments of the present disclosure. Components of computing system architecture 900 are in electrical communication with each other using a connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random-access memory (RAM) 925 to processor 910. Computing system 900 can include a cache of high-speed memory 912 connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any hardware arrangement, and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
obtaining location information associated with an incident;
obtaining one or more portions of three-dimensional (3D) mapping data based on the location information associated with the incident;
generating a 3D scene associated with the incident, wherein the 3D scene is generated based on the one or more portions of 3D mapping data;
rendering a first 3D view of the 3D scene, wherein the first 3D view includes one or more dynamic incident location indicators representing the location information of the incident relative to the 3D scene;
rendering a second 3D view of the 3D scene based on and including at least in part on one or more updated dynamic incident location indicators representing updated location information of the incident relative to the 3D scene, wherein the updated location information includes at least a height of the updated dynamic incident location indicators relative to a structure;
obtaining data including at least a height of the structure in the 3D scene; and
generating a collapse zone overlay on the first 3D view of the 3D scene, wherein the collapse zone overlay is generated based at least in part of the height of the structure and a factor.

2. The method of claim 1, wherein the location information includes at least one set of 3D coordinates associated with the incident.

3. The method of claim 1, wherein the one or more incident location indicators include:
a first incident location indicator associated with a two-dimensional (2D) location of the incident; and
a second incident location indicator associated with a 3D location of the incident, wherein the 3D location of the incident includes height information and the 2D location of the incident does not include height information.

4. The method of claim 3, further comprising:
rendering a second 3D view of the 3D scene, wherein the second 3D view of the 3D scene includes at least one of the one or more incident location indicators and is generated based on incident height information included in the location information.

5. The method of claim 4, wherein:
the second 3D view of the 3D scene includes the second incident location indicator;
the second incident location indicator is generated based on the incident height information included in the location information; and
the second 3D view of the 3D scene comprises one or more portions of the 3D scene associated with a height larger than the second incident location indicator, wherein said one or more portions of the 3D scene are rendered as transparent or semi-transparent.

6. The method of claim 4, wherein the 3D scene is generated to include one or more rendered 3D building structures each including a plurality of different floors, each respective floor of the plurality of different floors associated with a different height.

7. The method of claim 6, wherein the second 3D view includes:
the first incident location indicator, the first incident location indicator rendered at a height that is above the plurality of different floors included in a given rendered 3D building structure associated with the location information of the incident; and
the second incident location indicator, the second incident location indicator rendered at a respective floor of the given rendered 3D building structure that is associated with the incident height information.

8. The method of claim 7, further comprising rendering the second 3D view of the 3D scene by:
generating an opaque rendering of the respective floor of the given rendered 3D building structure that is associated with the incident height information, wherein the second incident location indicator is rendered above an upper surface of the opaque rendering of the respective floor; and
generating one or more transparent or semi-transparent renderings of floors included in the given rendered 3D building structure and not associated with the incident height information.

9. The method of claim 1, wherein the 3D mapping data includes Geographic Information System (GIS) data.

10. The method of claim 1, further comprising:
obtaining data indicative of a collapse zone area, the collapse zone area included in the 3D scene, wherein the data includes one or more user inputs; and
generating the collapse zone overlay on the first 3D view of the 3D scene, wherein the collapse zone overlay is generated based on at least the collapse zone area.

11. The method of claim 10, wherein:
the collapse zone area comprises a base collapse zone shape coplanar with or parallel to a ground surface of the 3D scene; and
the one or more user inputs are further indicative of a maximum building height associated with the base collapse zone shape coplanar of the collapse zone area.

12. The method of claim 1, further comprising:
obtaining data indicative of a safety zone area, the safety zone area included in the 3D scene; and
generating one or more safety zone overlays on the first 3D view of the 3D scene, wherein the one or more safety zone overlays are each generated based on at least the safety zone area.

13. The method of claim 12, wherein:
the safety zone area comprises a safety zone center point coplanar with a ground surface of the 3D scene or comprises a base safety zone shape coplanar with or parallel to the ground surface of the 3D scene; and the data indicative of a safety zone area are further indicative of at least one dimensional coordinate associated with each safety zone overlay, the at least one dimensional coordinate defined with respect to the safety zone center point coplanar or an outer perimeter of the base safety zone shape coplanar.

14. The method of claim 1, wherein the factor is a numerical value between 0.5 and 1.5.

15. The method of claim 1, wherein the one or more updated dynamic incident location indicators are an update of the one or more dynamic incident location indicators.

16. A system comprising:
one or more processors; and
one or more computer-readable storage media having computer-readable instructions stored thereon, wherein the computer-readable instructions, when executed by the one or more processors, cause the one or more processors to:
  obtain location information associated with an incident;
  obtain one or more portions of three-dimensional (3D) mapping data based on the location information associated with the incident;
  generate a 3D scene associated with the incident, wherein the 3D scene is generated based on the one or more portions of 3D mapping data;
  render a first 3D view of the 3D scene, wherein the first 3D view includes one or more dynamic incident location indicators representing the location information of the incident relative to the 3D scene;
  render a second 3D view of the 3D scene based on and including at least in part on one or more updated dynamic incident location indicators representing updated location information of the incident relative to the 3D scene, wherein the updated location information includes at least a height of the updated dynamic incident location indicators relative to a structure;
  obtain data including at least a height of the structure in the 3D scene; and
  generate a collapse zone overlay on the first 3D view of the 3D scene, wherein the collapse zone overlay is generated based at least in part of the height of the structure and a factor.

17. The system of claim 16, wherein the location information includes at least one set of 3D coordinates associated with the incident.

18. The system of claim 16, wherein the one or more incident location indicators include:
a first incident location indicator associated with a two-dimensional (2D) location of the incident; and
a second incident location indicator associated with a 3D location of the incident, wherein the 3D location of the incident includes height information and the 2D location of the incident does not include height information.

19. The system of claim 18, further comprising instructions which when executed by the one or more processors, cause the one or more processors to:
rendering a second 3D view of the 3D scene, wherein the second 3D view of the 3D scene includes at least one of the one or more incident location indicators and is generated based on incident height information included in the location information.

20. The system of claim 19, wherein:
the second 3D view of the 3D scene includes the second incident location indicator;
the second incident location indicator is generated based on the incident height information included in the location information; and
the second 3D view of the 3D scene comprises one or more portions of the 3D scene associated with a height larger than the second incident location indicator, wherein said one or more portions of the 3D scene are rendered as transparent or semi-transparent.

21. The system of claim 19, wherein the 3D scene is generated to include one or more rendered 3D building structures each including a plurality of different floors, each respective floor of the plurality of different floors associated with a different height.

22. One or more non-transitory computer-readable media comprising computer-readable instructions, which when executed by one or more processors of a 3D emergency response mapping and visualization service, cause the 3D emergency response mapping and visualization service to:
  obtain location information associated with an incident;
  obtain one or more portions of three-dimensional (3D) mapping data based on the location information associated with the incident;
  generate a 3D scene associated with the incident, wherein the 3D scene is generated based on the one or more portions of 3D mapping data;
  render a first 3D view of the 3D scene, wherein the first 3D view includes one or more dynamic incident location indicators representing the location information of the incident relative to the 3D scene;
  render a second 3D view of the 3D scene based on and including at least in part on one or more updated dynamic incident location indicators representing updated location information of the incident relative to the 3D scene, wherein the updated location information includes at least a height of the updated dynamic incident location indicators relative to a structure; obtain data including at least a height of the structure in the 3D scene; and
  generate a collapse zone overlay on the first 3D view of the 3D scene, wherein the collapse zone overlay is generated based at least in part of the height of the structure and a factor.

* * * * *